US012560149B2

(12) United States Patent (10) Patent No.: US 12,560,149 B2

Grimm (45) Date of Patent: Feb. 24, 2026

(54) DEVICE COMPRISING AN ASYMMETRICAL ADJUSTABLE WING PROFILE

(71) Applicant: Friedrich Grimm, Stuttgart (DE)

(72) Inventor: Friedrich Grimm, Stuttgart (DE)

( * ) Notice: Subject to any disclaimer, the term of this patent is extended or adjusted under 35 U.S.C. 154(b) by 0 days.

(21) Appl. No.: 18/714,058

(22) PCT Filed: Nov. 4, 2022

(86) PCT No.: PCT/EP2022/080886

§ 371 (c)(1),
(2) Date: May 28, 2024

(87) PCT Pub. No.: WO2023/099117

PCT Pub. Date: Jun. 8, 2023

(65) Prior Publication Data

US 2025/0020101 A1 Jan. 16, 2025

(30) Foreign Application Priority Data

Dec. 1, 2021 (DE) ..................... 10 2021 005 965.4

(51) Int. Cl.
F03D 3/06 (2006.01)
B64C 3/48 (2006.01)

(52) U.S. Cl.
CPC ................ F03D 3/061 (2013.01); B64C 3/48 (2013.01); F03D 3/068 (2013.01); *F05B 2210/16* (2013.01); *F05B 2250/131* (2013.01)

(58) Field of Classification Search
CPC .... F01D 1/0641; F01D 1/0643; F01D 1/0675; F01D 1/0677; F03D 3/061; F03D 3/062; F03D 3/0641; F03D 3/0643; F03D 3/0675; F03D 3/0677; B64C 13/16; B64C 27/473; B64C 27/72; B64C 27/32; B64C 2027/7266; B64C 3/48; F05B 2210/16
See application file for complete search history.

(56) References Cited

U.S. PATENT DOCUMENTS 2,650,047 A * 8/1953 Stoner ....................... B64C 3/48
244/214
3,716,209 A 2/1973 Pierce
(Continued)

FOREIGN PATENT DOCUMENTS

DE 3825241 7/1988
DE 69916360 T2 5/1999
(Continued)

*Primary Examiner* — Nathaniel E Wiehe
*Assistant Examiner* — Maxime M Adjagbe
(74) *Attorney, Agent, or Firm* — FRESH IP PLC

(57) ABSTRACT

The invention relates to a device comprising an asymmetrical wing profile (2) and an adjusting device (15), which asymmetrical wing profile (2) has a profile thickness (q) and a profile chord (p) extending between a wing leading edge (n) and a wing trailing edge (e), which asymmetrical wing profile (2) has, in at least one longitudinal portion (L1-Ln), a three-part variable wing profile (21) in which a front and a rear wing segment (211, 213) are joined to a central wing segment (212) in an articulated manner by means of two hinges (214) having axes of rotation (z) and are designed to permit a rotational movement about the associated axis of rotation (z) with respect to the central wing segment (212).

25 Claims, 24 Drawing Sheets

(56)     References Cited

U.S. PATENT DOCUMENTS

Figure 1:
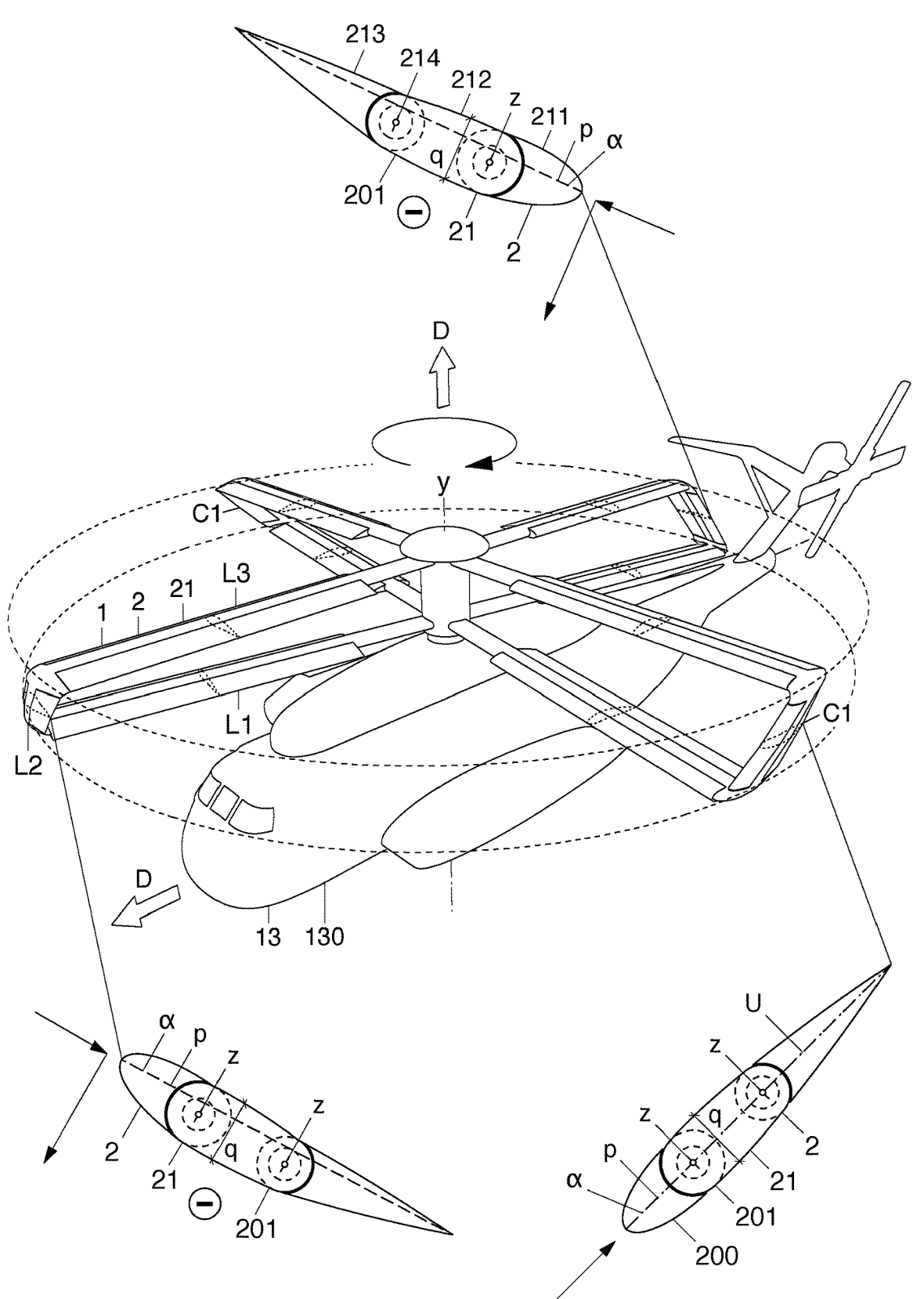

| 4,383,801 | A | 5/1983 | Pryor |
| 5,114,104 | A | 5/1992 | Cincotta |
| 9,346,535 | B1 | 5/2016 | Adams |
| 2008/0011900 | A1 | 1/2008 | Quintana |
| 2010/0247314 | A1 | 9/2010 | Narasimalu |
| 2017/0051720 | A1 | 2/2017 | Grigg |
| 2019/0374868 | A1* | 12/2019 | Russell .................. A63H 27/00 |

FOREIGN PATENT DOCUMENTS

| DE | 102008025414 | | 5/2008 |
| DE | 102010011708 | | 3/2010 |
| DE | 102010047918 | | 10/2010 |
| DE | 102017011890 | | 12/2017 |
| DE | 102020007543 | B3 | 12/2020 |
| GB | 1023766 | A | 3/1966 |
| GB | 2386884 | A | 10/2003 |
| KR | 20120041722 | | 2/2012 |
| WO | WO 85/00573 | | 2/1985 |
| WO | WO 2017/089047 | | 6/2017 |
| WO | WO 2017/112973 | | 7/2017 |

* cited by examiner

Fig.13

DEVICE COMPRISING AN ASYMMETRICAL ADJUSTABLE WING PROFILE

The invention relates to a device with an asymmetrical wing profile and with an adjusting device.

The device with the asymmetrical wing profile and with the adjusting device can be designed as a wind and water turbine as well as an aircraft. Designs that have a plurality of these properties are also possible, for example an aircraft that can also be used as a wind and water turbine or has one.

In the context of the invention, the generic term aircraft relates in particular to rotary-wing vehicles such as helicopters, but also to aircraft with wings. In the case of aircraft, the incident flow is composed of the speed of travel or flight, the speed of the wind, and the speed of the respective flight maneuver and, in the case of helicopters, also the rotational speed of the rotor blades, and forms a resultant or relative incident flow, while in the case of wind and water turbines the incident flow results from the speed of the respective flow and the rotational speed of the rotor blades.

PRIOR ART

Adjustable rotor blades for wind or water turbines and for rotary-wing vehicles, such as watercraft, aircraft, and in particular helicopters, are known per se. On airplanes, adjustable wing profiles are formed for example on the wings, on which parts of the tail unit, such as ailerons, landing flap support fairings, as well as slats with air gaps that open when actuated and a large number of movable flaps are provided, which perceptibly disturb the ideally laminar flow around the variable wing profile of a wing. Known solutions for the adjustment of rotor blades with a symmetrical or asymmetrical wing profile use a gear mechanism with push rods, such that the rotor blades are subjected to abrupt load changes during a rotation. The angle of attack of the rotor blade chord changes abruptly, e.g. in a helicopter or in a wind turbine with a vertical axis of rotation or in a Voith Schneider propeller. Violent load change reactions thus triggered are transferred directly to the structure of a rotary-wing vehicle and a wind or water turbine, causing extreme dynamic stresses on the overall system and propagating in the surrounding fluid as pressure waves. Probably the most prominent example of such rotary-wing kinematics is a helicopter. Compared to a fixed-wing aircraft, the helicopter has the advantage that it does not require a landing and take-off runway and can take off and land vertically. The ability to hover, i.e. to remain stationary in the air, and the possibility of flying sideways or performing a slow turn about the vertical axis are further specific advantages of this rotary-wing vehicle. However, the advantages are offset by some disadvantages, which are briefly mentioned below. The helicopter is not inherently stable, its center of gravity is above the fuselage, so that the pilot must continuously adjust the flight attitude. By displacing the swashplate up or down, the angle of attack of the rotor blades is changed directly, which increases or decreases the lift of the main rotor, causing the helicopter to climb or descend. This flight maneuver alone is associated with a change in engine or turbine power and requires counter-steering by means of the tail rotor. When flying straight ahead, the swashplate and the rotor plane are tilted in the direction of flight. The maximum speed of a helicopter is limited by the aerodynamics of the rotor blades, as the blade moving forwards has a higher speed than the rotor blade moving backwards due to the incoming air. This creates an imbalance between the leading blade and the trailing blade.

With the leading blade, the forward speed and the rotational speed overlap, so that with a rotor diameter of ten meters, for example, the speed of sound is very quickly exceeded at the blade tips. If this point is reached, there are not only aerodynamic disadvantages, but also an unpleasant noise development. Therefore, the top speed of a helicopter is approximately 200-300 km/h, wherein a combat helicopter can reach a speed of more than 400 km/h. The helicopter is exposed to very strong vibrations caused by the swashplate. In addition to the lower forward speed of this aircraft compared to a fixed-wing aircraft, it has a limited ceiling, which is typically 5,000 meters and can be up to 12,000 meters for a combat helicopter. The flight performance is accompanied by increased fuel consumption. As a special form of helicopter, the gyrocopter has established itself as a small aircraft. The ability to autorotate in the event of engine failure and the possibility of folding the rotor blades on the axis of rotation to save space opens up the possibility of an individual mobility offering that combines the advantages of a motor vehicle with those of a small aircraft. However, the system-related disadvantages of the rotary-wing kinematics of a helicopter remain. In the field of control technology, current developments in actuators for electromagnetic valve control in combustion engines should be mentioned here. Rotational speeds of 7000 rpm are common in combustion engines, so that the high frequency and stability of an electromagnetic actuator required there seem particularly suitable for the controller of rotary-wing kinematics of a helicopter. Current developments for rotary-wing vehicles are based on the principle of the Voith-Schneider propeller as an aircraft propulsion system. The Voith-Schneider propeller is not a pure lifting rotor, but with its special rotary-wing kinematics it pushes away from the fluid involved at certain positions of the rotor, resulting in high loads on the gear mechanism and an upwardly limited rotational speed. Although the Voith-Schneider propeller has a good efficiency at low forward speeds, the propulsion power decreases rapidly as the forward speed of a watercraft increases, so that an upper limit is reached at approximately seven knots and therefore the application of this propeller is limited to slow-moving watercraft such as tugboats, as well as commuting ferries and other watercraft specializing in short distances. Wind power systems with a vertical axis of rotation are known as Darrieus rotors and are named after their inventor. Compared to wind power systems with a horizontal axis of rotation, they have the great advantage that they do not have to be aligned with the respective direction of flow. The Darrieus rotor runs quietly, as it reaches its optimum performance at a speed corresponding to three to four times the wind speed. The rotor blades are arranged at a radial distance from the axis of rotation and have a symmetrical wing profile. Based on Betz's law, which, for the utilization of the kinetic energy stored in a flow cross section, establishes a theoretical upper limit of 16/27ths of the total of said kinetic energy content, known vertical axis rotors achieve an efficiency of only from approximately 30% to a maximum of 45% with a symmetrical wing profile of the rotor blades, while the maximum efficiency for horizontal axis rotors with an asymmetrical wing profile is more than 50%. This significant difference can be explained by the fact that a symmetrical wing profile provides only about two-thirds of the lift of an asymmetrical wing profile under the same incident flow conditions. Coastal areas where certain relief formations cause high current velocities caused by high and low tides, as is the case with the Oosterschelde flood barrier in the Netherlands, for example, can be considered as a possibility for extensive use of hydropower. Between the pillars of this barrier, the water dammed up in the Oosterschelde flows unused into the North Sea at low tide at a high current speed. Tidal power plants and ocean current power plants will play a decisive role in the generation of renewable energy in the future. The further expansion of hydropower in Germany suffers from the conflict of objectives between power generation at transverse structures in river courses and the associated consequence of interrupting the natural migration routes for fish and therefore cannot simply be continued with the technologies used up to now for generating hydropower.

U.S. Pat. No. 4,383,801 A shows a pivoting rotor blade for a wind turbine with a vertical axis of rotation, which in the preferred embodiment is designed in one piece, but as shown there in FIG. 4 can also be designed in two or three parts and is adjusted on the axis of rotation by means of an external gear mechanism.

DE 10 2020 007 543 B3 describes a wind turbine with a vertical axis of rotation in which the suction side of the rotor blades changes from the outside to the inside of the orbit twice in one revolution of the rotor. A pneumatic adjusting device made up of hoses moves the front and rear wing segments of the three-part rotor blades.

US 2017/0 051 720 A1 shows a wind turbine with a vertical axis of rotation, in which the suction side of multi-part adjustable rotor blades can be aligned to the leeward side by means of cable pulls or push rods and by means of gear mechanisms in one revolution of the rotor blade.

DE 38 25 241 A1 shows a wind turbine with a vertical axis of rotation, in which rotor blades composed of segments are equipped with a load-bearing central spar made of steel and with ballast weights, wherein at least the segment with the trailing edge is movable.

DE 10 2010 047 918 A1 describes a wind turbine with a horizontal axis of rotation in which the rear edges of the rotor blades are designed to be movable by means of pneumatic muscles in order to adapt the rotor blades to the respective aerodynamic load in order to increase the performance of the rotor.

U.S. Pat. No. 5,114,104 A shows an adjustable rotor blade in which a kinematic chain is provided between a leading edge segment and a trailing edge segment of the rotor blade in order to convert the wing profile, which is symmetrical in a basic position, into an asymmetrical wing profile.

DE 10 2008 025 414 A1 describes an aerodynamically deformable profile with a contour that can be reversibly deformed by means of actuators for aircraft and in particular for rotary-wing aircraft, in which a cover skin is connected to a shear-flexible sandwich core and to flexible webs arranged transversely to the direction of deformation.

US 2010/0 247 314 A1 shows a rotor blade for a wind turbine with an adjustable trailing edge, in which actuators arranged in pairs each have a stack of piezoelectric elements, so that the adjustment of the trailing edge of the rotor blade is caused by a change in the length of the piezoelectric elements.

DE 699 16 360 T2 shows a wing profile for an aircraft with movable leading and trailing edges. The wing profile has two elastically deformable elastomer plates on the wing leading edge, which can be adjusted by means of a rotary actuator, while the trailing edge of the wing can be adjusted by means of a linear actuator.

U.S. Pat. No. 3,716,209 A describes an adjustable wing leading edge for the wing of an aircraft, in which the profile contour is maintained by means of a kinematic structure formed by pressure rods and by means of a rotatable leading edge segment.

KR 10 2012 0 041 722 A describes a wind turbine with a vertical axis of rotation and three-part rotor blades, in which the blade adjustment is effected by means of a translational movement of actuators for the front and rear blade segments.

WO 2017/089 047 A1 describes a wind turbine with a vertical axis of rotation, in which one-piece rotor blades are mounted rotatably on a circular path and can be oriented with a curved upper side in the leeward direction.

DE 10 2010 011 708 A1 describes a turbine with a passive blade position in which a gear mechanism with a linkage enables the rotor blades to be adjusted in such a manner that the suction side is in each case aligned on the leeward side to the wind direction.

DE 10 2017 011 890 A1 describes an aircraft in which rotary-wing kinematics are realized with a linkage located outside the rotor blade.

U.S. Pat. No. 9,346,535 B1 describes an aircraft with a rotary wing arrangement in which the blade adjustment of one-piece rotor blades is effected by means of a cycloidal gear mechanism with a linkage.

US 2008/0 011 900 A1 describes a rotary wing arrangement for an airship in which the rotor blades are adjusted by means of a gear mechanism with linkage.

WO 2017 112 973 A1 describes an aircraft with rotary-wing rotors whose rotor blades can be adjusted in one revolution of the rotary-wing rotor by means of a gear mechanism and a linkage.

Task

Based on the prior art described, the invention is based on the object of providing a new device with an asymmetrical wing profile and with an adjusting device which is designed to influence the lift on a device resulting from the incident flow of the asymmetrical wing profile.

This object is achieved by the subject matter of claim 1.

A device has an asymmetrical wing profile and an adjusting device. The asymmetrical wing profile has a wing profile thickness and a wing profile chord extending between a wing leading edge and a wing trailing edge. In at least one longitudinal portion, the asymmetrical wing profile has a three-part variable wing profile, in which a front and a rear wing segment are joined in an articulated manner to a central wing segment by means of two hinges with axes of rotation and are designed to enable a rotary movement about the associated axis of rotation relative to the central wing segment. The central wing segment is designed as an inherently rigid housing for accommodating an adjusting device and has a hollow profile as a longitudinal member of the asymmetrical wing profile, which forms an abutment for the adjusting device in at least one longitudinal portion. The adjusting device is designed to enable simultaneous turning in or out of the front and rear wing segments in opposite directions of rotation with the aid of the at least one electric motor in such a manner that a variable suction side of the asymmetrical wing profile is achieved, and preferably the angle of attack of the profile chord changes when the front and rear wing segments are turned in or out.

Further advantageous features and embodiments of the invention are shown in the subclaims.

In detail, the invention preferably has the following advantageous features or embodiments:

Specification of a rotor blade for wind or water turbines that generates a tangential drive force derived from the lift at ten of twelve rotating positions shown as examples, Specification of a rotor blade for a rotary-wing vehicle that generates a thrust force derived from the lift in any desired direction of travel at ten of twelve rotating positions shown as examples, Specification of a straight, bow-shaped, or polygonal rotor blade, Specification of a three-part wing profile whose surfaces carry photovoltaic cells, Specification of a rotor blade for a wind turbine with operating positions for wind forces 3-5 and 5-9 as well as 9-12 according to the Beaufort scale, Specification of two adjustment sectors opposite each other on the orbit to avoid abrupt load changes of the incident flow, Specification of a fully electric, contactless adjusting device for a rotor blade with a three-part wing profile, Specification of an electromechanical adjusting device with bevel gear or with cylinder locks for the three-part wing profile of a water turbine, Specification of a rotor blade that is connected directly or indirectly to a motor generator at least at one end, Specification of a laminated core formed by laminations for the stator of an electrical adjusting device, Specification of a water turbine with a disk-shaped float, Specification of a transverse structure passable for fish having a plurality of water turbines, Specification of a storm surge barrier with water turbines, Specification of electromechanical adjusting devices for the rotor blades of water turbines, Specification of fully electric rotor blade adjusting devices for rotary-wing aircraft and in particular for helicopters, Specification of a wing profile for an airplane with a variable chord and a variable camber of the suction side, Specification of a wind turbine with a horizontal axis of rotation for radial rotor blades in a plane of rotation, Specification of a pitch stall regulation for a wind turbine by means of a negative angle of attack of the chord of the three-part wing profile, Specification of a wind or water turbine for an air or water flow that changes direction diametrally, Specification of a rotary wing drive for an air or water flow that changes direction diametrally, Specification of a horizontal spoked wheel with a vertical axis of rotation, the outer ring support of which carries a plurality of rotor blades aligned parallel to the axis of rotation, Specification of a horizontal spoked wheel with cable tensioning for the longitudinal member of the rotor blade, Specification of a horizontal, cable-tensioned spoked wheel with vertically arranged suspension cables that create a polygonal course of the radial suspension and tensioning cables, Specification of a transverse thruster effective in two directions, Specification of straight, uniaxially curved rotor blades that are coated with PV cells on both sides, Specification of a common floating body formed by a buoy for a wind turbine and for a water turbine, with vertical axis of rotation.

Fully Electric Adjusting Devices

In a preferred embodiment, the adjusting device is fully electric and consists of a double-acting stepper motor with stator and rotor.

The stepper motor is integrated into the housing formed by the central wing segment, which, as a longitudinal member of the wing profile, forms an abutment for the stator in each longitudinal portion of the wing profile with two exciter windings for the two rotors of the radial stepper motor located opposite to one another on the orbit. The rotors are connected in an articulated manner to lever arms of the front and rear wing segments and each rotate about the axes of rotation of the hinges of the center wing segment, forming counterweights to the front and rear wing segments of the rotor blade, so that alternately poled permanent magnets of the rotors create an air gap on both sides for a contactless magnetic or electromagnetic connection between the center wing segment and the front and rear wing segments. By reversing the polarity of the exciter windings of the stator, the electrical turning in and out of the front and rear wing segments is effected simultaneously in opposite directions of rotation. In another particularly advantageous variant embodiment for purely electric adjustment of the rotor blade, the adjusting device is formed by two linear motors integrated into the central wing segment of the rotor blade. The rotors of the linear motors are assigned to the front and rear wing segments and are linked to the central wing segment with a lever arm. By means of a control unit, the suction side of the variable wing profile changes orientation twice from the inside to the outside of the orbit at each of the adjustment positions of a diameter of the orbit that can be freely set at a full angle. The positioning function of the two rotors is activated by applying an electrical voltage, wherein alternately polarized permanent magnets interact with a reversible exciter winding of the stator, so that the inclination angle of the rotor blade chord, e.g. on a helicopter, can undergo up to 30 load changes in one second by means of an oscillating linear movement of the linear motors. Each rotor has two tongues, each with a row of permanent magnets with alternating polarity. An air gap on both sides between the stator and the permanent magnets of the rotor creates a direct, contactless (magnetic) active connection between the central wing segment and the front and rear wing segments. Controlled polarity reversal of the stator's exciter windings causes the front and rear wing segments to turn in and out simultaneously in opposite directions.

Electromechanical Adjusting Devices

In a particularly advantageous embodiment for turning the front and rear wing segments in and out, an electromechanical adjusting device is provided in which electric motors are formed with a stepped detent gear mechanism for retaining elements in each longitudinal portion of the asymmetrical wing profile. In a first embodiment, the shaft of the electric motor is arranged transversely to the longitudinal axis of the rotor blade and connected to cylinder locks for locking the front and rear wing segments. In a second embodiment, the shaft of the electric motor is arranged parallel to the axes of rotation of the hinges of the central blade segment and locks the front and rear blade segments by means of a worm gear. In the case of a rotor blade, the direction of rotation of the electric motor with the step detent gear mechanism changes in one revolution of the rotor blade at each of the adjusting positions of the orbit. In a further advantageous electromechanical design variant for the simultaneous turning in and out of the front and rear wing segments of the asymmetrical wing profile, linear motors are arranged coaxially and concentrically to the axes of rotation, and actuate sliders. Here threads of the front and rear blade segments engage with threads of the slider moved by the linear motor and cause the front and rear blade segments to rotate in opposite directions. Air bearings between the threads of the hinges and between the rotor and the stator keep the frictional forces low and are supplied with compressed air through the hollow profile of the hinges. In a linear motor, the electro-magnetically induced field of the exciter windings can be aligned either parallel or perpendicular to the direction of movement of the rotor, depending on the design. The linear motor allows an exact positioning of the slide formed as a rotor, so that the positive angle of attack for the blade segments can be set and varied precisely. The adjusting device with the adjusting and holding function is designed to absorb considerable aerodynamically induced suction forces and, in the case of a rotor blade, centrifugal forces, wherein the front and rear wing segments can be individually adjusted and locked in each longitudinal portion. The small pitch of the threads enables a translation ratio of the adjust-ment force of preferably 1 to 10.

Rotor Blade and Rotor Module

The rotor blade with the asymmetrical wing profile is subdivided into a number of longitudinal portions and is straight, bow-shaped, or polygon-shaped. A plurality of rotor blades, which are connected at least one end to a motor generator, form a rotor module. The rotor module rotates about an axis of rotation on an orbit defined by a radius, which can be divided into two halves by a diameter that can be freely adjusted within 360 degrees with two adjustment positions. By means of the adjusting device, the suction sides of the variable wing profile are oriented towards the outside in a first half of the orbit and towards the inside of the orbit in a second half. At the diameter with the adjust-ment positions, the asymmetrical wing profile temporarily takes on the shape of a symmetrical wing profile, the chord of which is aligned tangentially to the circular orbit of the rotor module. The simultaneous turning in and out of the front and rear wing segments, each in the opposite direction, gives the chord an angle of attack that has a positive value in both halves of the orbit. In each longitudinal portion of the asymmetrical wing profile, the central wing segment forms a housing for the adjusting device formed by at least one electric motor and forms a longitudinal beam of the rotor blade with a box-shaped hollow profile, the flanges of which, which lie opposite to one another on the orbit, form part of the surface of the asymmetrical wing profile. A multiplicity of the longitudinal beams, which are formed as hollow profiles, are each connected to transversely stiffening ring supports at nodal points, so that a self-supporting rotor module is formed that is inherently resistant to bending, shear and torsion. The straight, bow-shaped, or polygon-shaped rotor blade of a rotor module is aligned parallel to the axis of rotation in at least one longitudinal portion. At the freely adjustable full-angle positions of a diameter of the orbit, the adjusting device formed by electric motors is actuated in such a manner that the suction side of the variable wing profile changes from the outside to the inside of the orbit in one revolution of the rotor blade and vice versa. The front and rear wing segments can each be adjusted by up to eight degrees, in relation to the central wing segment formed by the longitudinal member, at the adjustment positions in the axes of rotation of the hinges of the central wing segment with opposite direction of rotation, so that a positive angle of attack of the profile chord is maintained in both halves of the orbit of the variable wing profile either electromagnetically by means of the air gap between the rotors and the stators of the electric motors or by means of retaining elements of a stepper detent gear mechanism connected to the electric motors. Between the wing segments of the three-part wing profile, hinge gaps are formed between the front wing segment with the wing leading edge and the central wing segment arranged in the area of the maximum profile thickness of the wing profile and the rear wing segment with the trailing edge of the wing, so that preferably, with the exception of the hinge gaps, the wing surfaces of the three-part wing profile can carry photovoltaic cells over their entire surface.

Rotary-Wing Turbines and Rotary-Wing Vehicles

In contrast to a rotary-wing turbine, in a rotary-wing vehicle the suction sides of the asymmetrical wing profile can be aligned to the respective direction of travel at the diameter, freely adjustable in the full angle, with the adjust-ment positions on the orbit of the rotor blades in both halves of the orbit of the rotor module, and are designed to generate thrust in the direction of flight or in the direction of travel, or reverse thrust against the direction of flight or the direc-tion of travel. In the case of a wind or water turbine, the suction sides of the asymmetrical wing profile can be aligned to the leeward side of the flow at the diameter, be freely adjustable in the full angle, with the adjustment positions on the orbit independently of a horizontally or vertically aligned axis of rotation. A particularly advanta-geous embodiment relates to rotary wing turbines and rotary wing vehicles in which the direction of the flow regularly changes diametrally. This is the case, for example, in a wave power plant with an air chamber, in which the shaft displaces a volume of air from the air chamber so that a landward air flow is used to drive a wind turbine, wherein a seaward air flow generated by the returning shaft continues to drive the wind turbine while maintaining the direction of rotation by changing the suction side of radial rotor blades arranged in a plane of rotation to the side facing away from the flow in each case by means of the adjusting device. A flow that periodically changes direction is also generated by tidal currents, so that a water turbine in principle has the same structure as a wind turbine. The advantage for both the wind turbine and the water turbine is that in a neutral transitional position, when the direction of the flow changes, the chord of the variable wing profile is arranged parallel to the plane of rotation and, by means of the adjusting device, the chord can have a positive angle of attack of up to four degrees relative to the symmetrical wing profile temporarily present in a transitional position, so that the lift generated by the resulting incident flow at the plane of rotation produces a maximum tangential driving force. As a counterpart to the wind or water turbine, which is designed for a flow that changes direction diametrally, a transverse thruster driven by the motor generator is proposed for a watercraft, in which the suction side of the rotor blades arranged radially in a rotor plane with the asymmetrical wing profile can be oriented in the thrust direction as required without changing the direction of rotation of the motor generator.

Rotary Wing Vehicles and Airplanes

In one embodiment, the rotary-wing vehicle is designed as a helicopter, which has either a single rotor module or a front and rear rotor module, each rotating in opposite directions. The rotor blade of the helicopter is shaped like a bow and has an asymmetrical wing profile, which is formed on a lower longitudinal portion running ahead in the direc-tion of rotation of the rotor module on a central longitudinal portion and on an upper longitudinal portion running behind in the direction of rotation of the rotor module. The lower longitudinal portion is arranged in relation to the upper longitudinal portion in the circumferential direction with an offset of approximately 10 degrees, wherein the central longitudinal portion connects the lower longitudinal portion to the upper longitudinal portion at an angle and is formed parallel to the axis of rotation with a slope in the direction of rotation. In the lower and upper longitudinal portions of the rotor module, the diameter can be aligned with the adjustment positions in the direction of flight, and in the central longitudinal portion transverse to the direction of flight. In a particularly advantageous embodiment of the helicopter, a rotor module consisting of four bow-shaped rotor blades forms a hybrid drive system together with a tail-side propeller arrangement connected to the drop-shaped fuselage of the helicopter. The four bow-shaped rotor blades each rotate in pairs and in opposite directions about the axis of rotation of the rotor module and around the streamlined fuselage, including a propeller arrangement at the rear, wherein a bow-shaped rotor blade has a longitudinal portion arranged above and below the fuselage parallel to the longitudinal axis and the longitudinal portions are each connected at their outer ends by the central longitudinal portion arranged parallel to the axis of rotation. This central longitudinal portion is designed to generate thrust in any desired flight direction from a stationary position, in that the diameter can be aligned perpendicular to the desired flight direction with the adjustment positions within a 360 degree radius. A further particularly advantageous embodiment for the variable asymmetrical wing profile with the adjusting device relates to the wing of an aircraft, in which in at least one longitudinal portion of the wing the central wing segment is designed as a housing for an electric motor, wherein the front and rear wing segments of the three-part wing profile are connected to the retaining element of an adjusting device formed by a stepped detent gear mechanism in such a manner that the lift generated by the suction side of the variable wing profile can be adapted to the respective flight situation of the aircraft by actuating the adjusting device, wherein the stepped detent gear mechanism preferably has a power transmission translation ratio of 1 to 10. At the design speed of the aircraft, the wings preferably have an angle of attack of approximately two degrees relative to the longitudinal axis of the aircraft. Actuating the adjusting device not only increases the wing camber of the asymmetrical wing profile, but also the angle of attack to an amount of approximately three to four degrees, so that a climb is made possible solely by actuating the adjusting device. During takeoff and landing, a maximum wing camber results in an angle of attack of up to six degrees. Therefore, extendable slats and tail flaps, which are not aerodynamically optimal due to ventilated gaps, can be largely dispensed with, so that the wing with the longitudinal beam rigidly connected to the fuselage and movable leading edge-side and tail-side wing segments does not require conventional slats and flaps and flap carrier fairings, so-called canopies, on the underside of the wing.

Wind and Water Turbines with a Vertical Axis of Rotation

In first embodiments for wind and water turbines, the rotor blades of a rotor module rotate on a cylindrical orbit about a vertical axis of rotation and change the orientation of the suction side of the asymmetrical wing profile at a diameter of the orbit that can be aligned perpendicular to the direction of flow. In a wind or water turbine, the suction side of the asymmetrical wing profile of the rotor blade is aligned with the respective flow direction at the diameter with the adjustment positions in both halves of the orbit of the rotor module by means of the adjusting device. A particularly advantageous embodiment of the wind turbine relates to a rotor module that uses the mass inertia caused by gyroscopic moments to stabilize the axis of rotation of the rotor module against changes in direction. In this case, the rotor module has a spoked wheel that rotates in a horizontal plane of rotation about a vertical axis of rotation and in which support and tension cables connect an outer ring support, radially spaced from the axis of rotation, to a hub. The ring support, designed as a thrust ring, carries a number of straight rotor blades arranged parallel to the vertical axis of rotation. The longitudinal beams of the rotor blades are connected to the ring support rigidly in terms of bending, and can also be stabilized with the support and tensioning cables of the spoked wheel by means of a cable tensioning system acting on the longitudinal beam. The hub of the spoked wheel is connected to a support structure of the wind turbine at an upper and a lower pivot bearing in such a manner that an air gap is formed between at least one stator on the support structure side, which is arranged coaxially and concentrically to the axis of rotation, and at least one rotor of the motor generator of the wind turbine on the hub side. The wind turbine with the gyroscope can be anchored onshore or offshore in a foundation, wherein the gyroscopic effect is preferably used for a wind turbine whose supporting structure has a floating body designed as a ballasted buoy, which can be anchored to the bottom of the sea by means of cables and anchors. The upper and lower radial spokes formed by cables can be connected to each other by vertical hangers and triangulated in the circumferential direction, so that the spoke wheel has a lightweight construction with predominantly axially stressed supporting members, and can therefore be designed with a diameter of several hundred meters. The following applies: The larger the diameter, the lower the centrifugal stress on the rotor blades. This relationship also applies to wind turbines in which a plurality of rotor modules are stacked vertically on top of each other and are supported by a spoke wheel on the base side with a ring support formed by a pressure ring. In this case, a plurality of rotor modules each have a three-part asymmetrical wing profile that changes the suction side of the wing profile from the outside to the inside of the orbit, and vice versa, at a diameter that can be aligned within a 360° radius to the respective wind direction. The rotor blades are spaced with a radius from the vertical axis of rotation and are each connected at their upper and lower ends to a circumferentially braced ring support. The ring support on the base side has compression rods that connect the rotor formed by the stacked rotor modules to the lower pivot bearing of a hub, while pairs of tension spokes, arranged in a V shape, are tensioned with the upper pivot bearing of the hub in such a manner that a vertical lever arm is formed between the upper pivot bearing and the lower pivot bearing in order to transfer the tilting moment of the rotor via the hub into a base, designed as a cantilever, of the wind turbine. With an incident flow area of, for example, 14,000 square meters of the filigree cylindrical cable-tensioned lattice shell, a peak output of around seven MW is achieved at wind speeds of up to twelve m/s, while at wind speeds of more than twelve m/s, double to triple the output can be achieved compared to a conventional wind turbine, which at this wind speed can only be operated at a throttled rate and is shut off completely during storms. Water turbines with a vertical axis of rotation are anchored in a body of water with a current, either in a transverse structure of the flowing water or in a floating manner. A floating water turbine has a floating body that floats on the surface of the water and accommodates a ring-shaped gearless motor generator with a shaft, and is anchored to the bottom of the body of water by means of at least one anchor and anchor cables. The rotor module of the water turbine is arranged below the floating body at a radial distance from the axis of rotation and consists of an upper and a lower ring support which are connected to one another by the longitudinal beams of a plurality of three-part rotor blades and together form a bending-, shear- and torsion-resistant rotor module by means of radial cable tensioning with the shaft of the motor generator.

The floating body is designed either as a rectangular raft with PV collectors (PV=photovoltaics) on the top or as a disc-shaped disk or a floating ring. A housing for the electric motors of the adjusting device is provided by the central wing segment arranged in the area of the maximum profile thickness of the asymmetrical wing profile, which segment forms a longitudinal member of the asymmetrical wing profile subdivided into a plurality of longitudinal portions and an abutment for the opposite-direction rotary movements of the front wing segment with the wing leading edge and the rear wing segment with the trailing edge.

By means of the adjusting device for the wing segments of the three-part wing profile, the angle of attack of the profile chord of the asymmetrical wing profile can be adjusted in relation to a temporarily usable symmetrical wing profile in such a manner that a tangential drive force can be derived from the lift of the variable wing profile in the case of the wind or water turbine and a thrust force can be so derived in the case of the rotary wing vehicle. A straight rotor blade rotates on a ring-shaped orbit in the rotor plane about the axis of rotation. The longitudinal member of the rotor blade formed by the central wing segment is designed as a wing root either at its outer or inner end and is rigidly connected to the motor generator, wherein the adjusting device in the case of the wind or water turbine is designed to align the suction side of the variable wing profile with the leeward side in a flow that periodically changes direction diametrally.

Wind and Water Turbines with a Horizontal Axis of Rotation

In wind or water turbines, the rotor module rotates in a vertical plane of rotation about a horizontal axis of rotation. A cable-tensioned spoke wheel with a hub and an outer ring support designed as a thrust ring can be aligned with the direction of flow by means of an azimuth bearing on a mast, wherein a plurality of rotor blades rotate on an annular orbit with an inner and an outer radius about the horizontal axis of rotation. The central wing segments of the twisted rotor blades, which are designed as longitudinal beams of the rotor blade, are connected to the ring support in a rigid manner by means of a clamp on rotor heads located opposite to one another in pairs in such a manner that in each longitudinal portion of the rotor blade the chord of the asymmetrical wing profile has a positive angle of attack of up to seven degrees in relation to an incident flow resulting from the wind and the rotational speed, so that the asymmetrical wing profile has an adjustable positive angle of attack over the entire length of the rotor blade. For a stall position, the front and rear wing segments of the rotor blade are turned windward, so that a negative angle of attack of the profile chords of the asymmetrical wing profile is created. A water turbine with a horizontal axis of rotation can be advantageously combined with a storm surge barrier, wherein rotor modules with a horizontal axis of rotation are arranged between the pillars for lockable gates and a bridge, which modules can be driven by the current and used to generate electricity at both high and low tide.

The Motor Generator

A freewheel between the rotor module and the motor generator enables generator operation of the motor generator in a rotary-wing vehicle that is anchored in a current, for example, or is descending as an aircraft. In the case of a wind or water turbine, the motor generator operates as a motor until the design speed of the rotor module is reached.

Further advantageous embodiments and features of the invention are shown in the figures.

Figure 2:
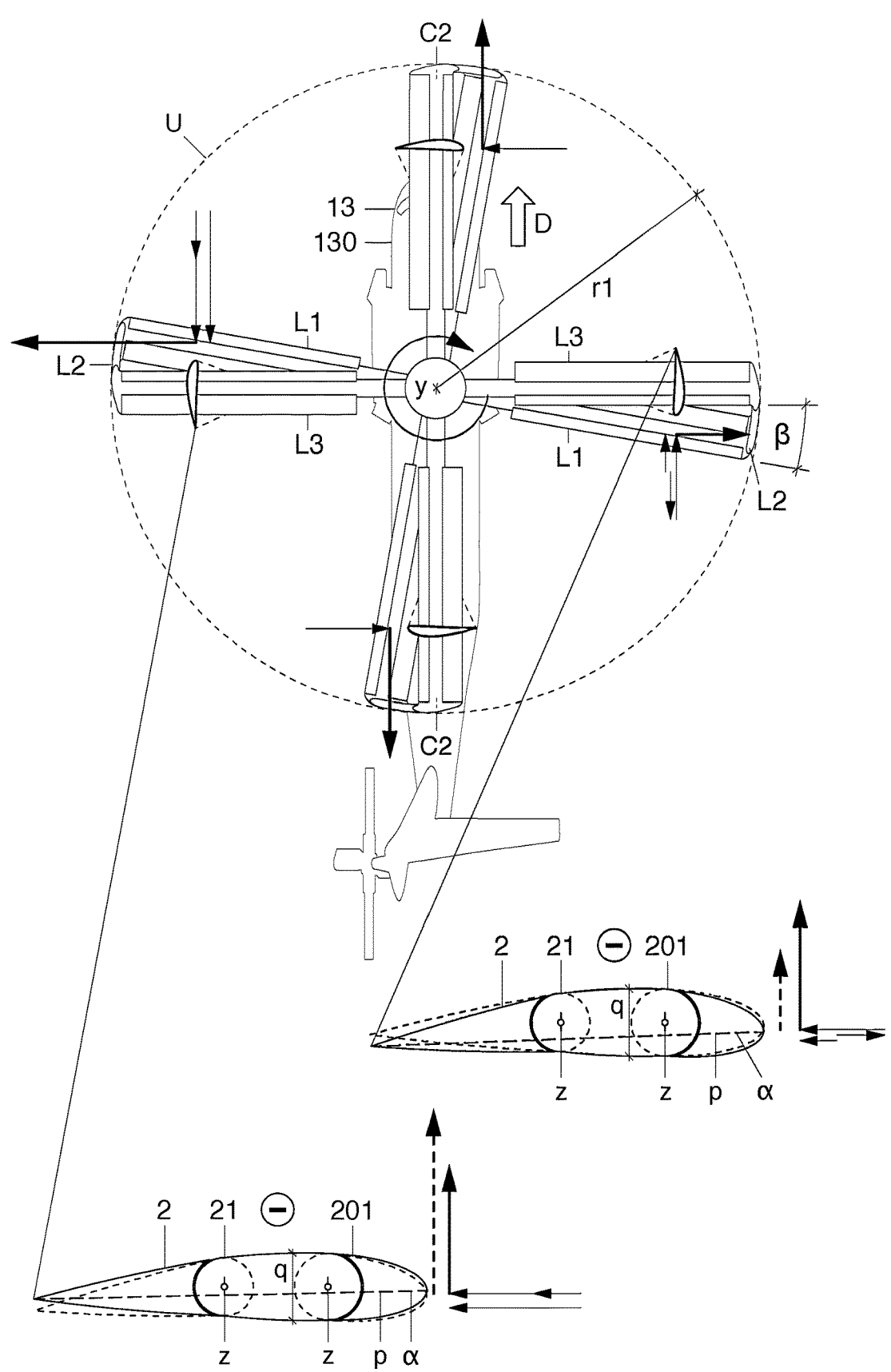
Figure 3:
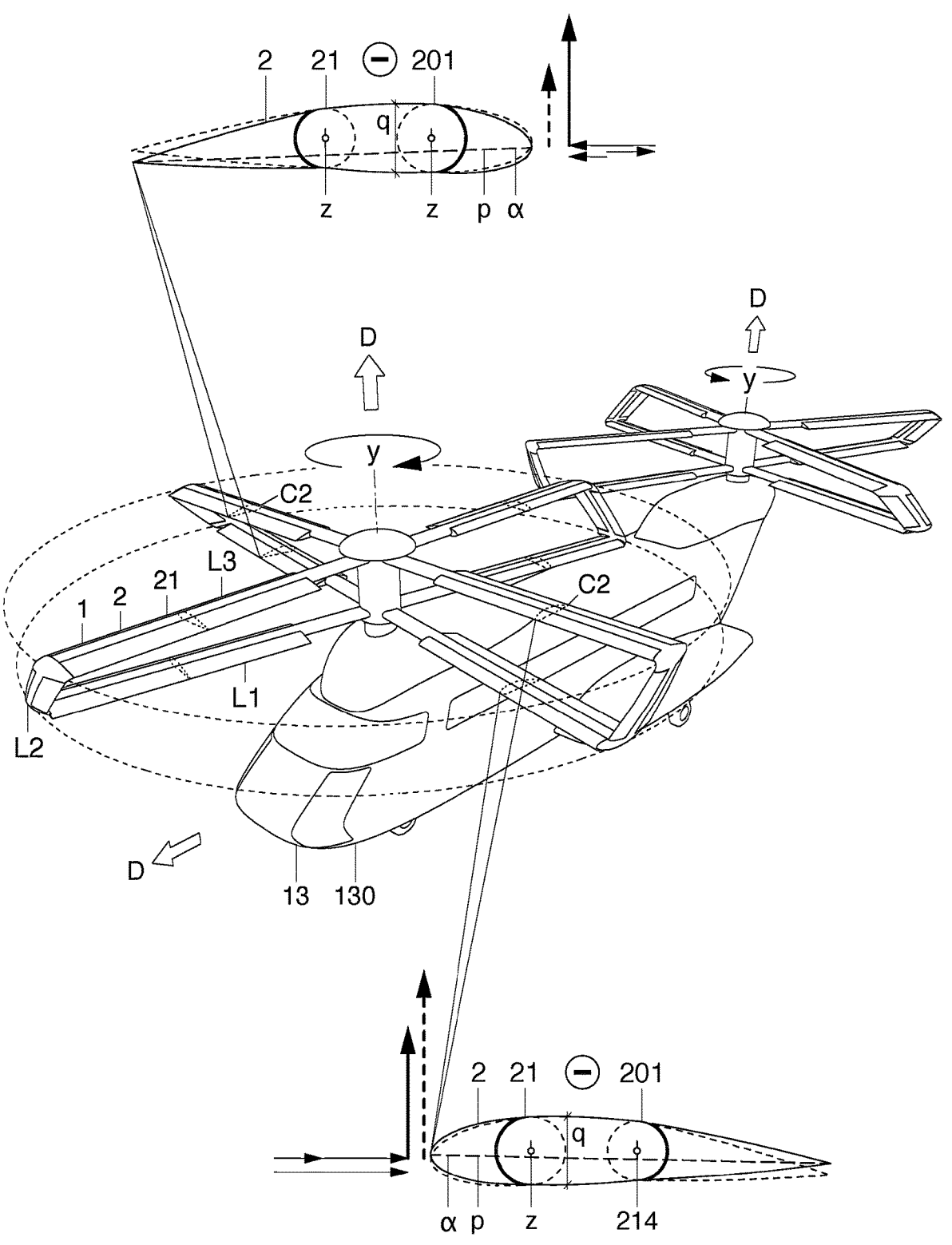
Figure 4:
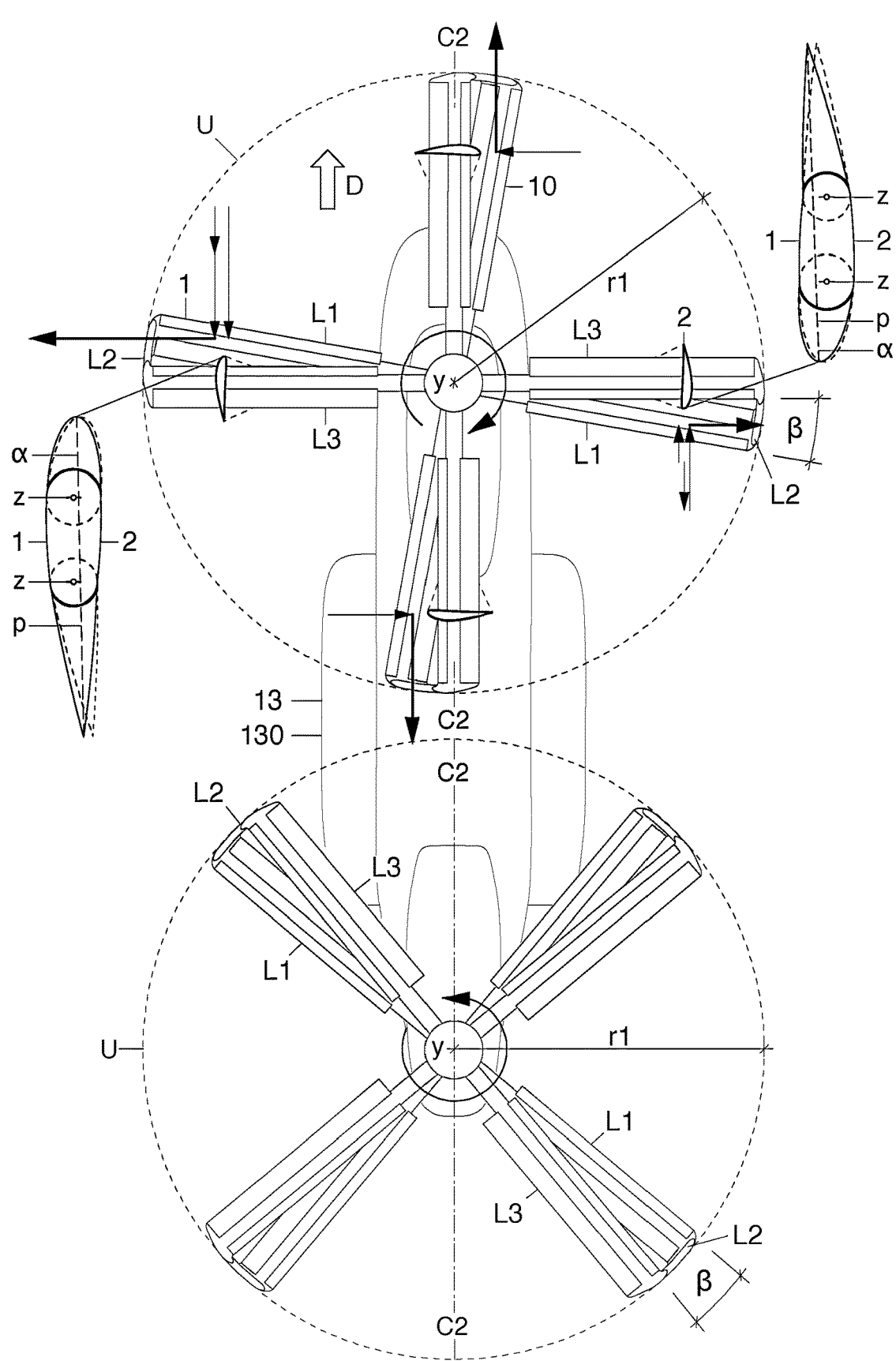
Figure 5:
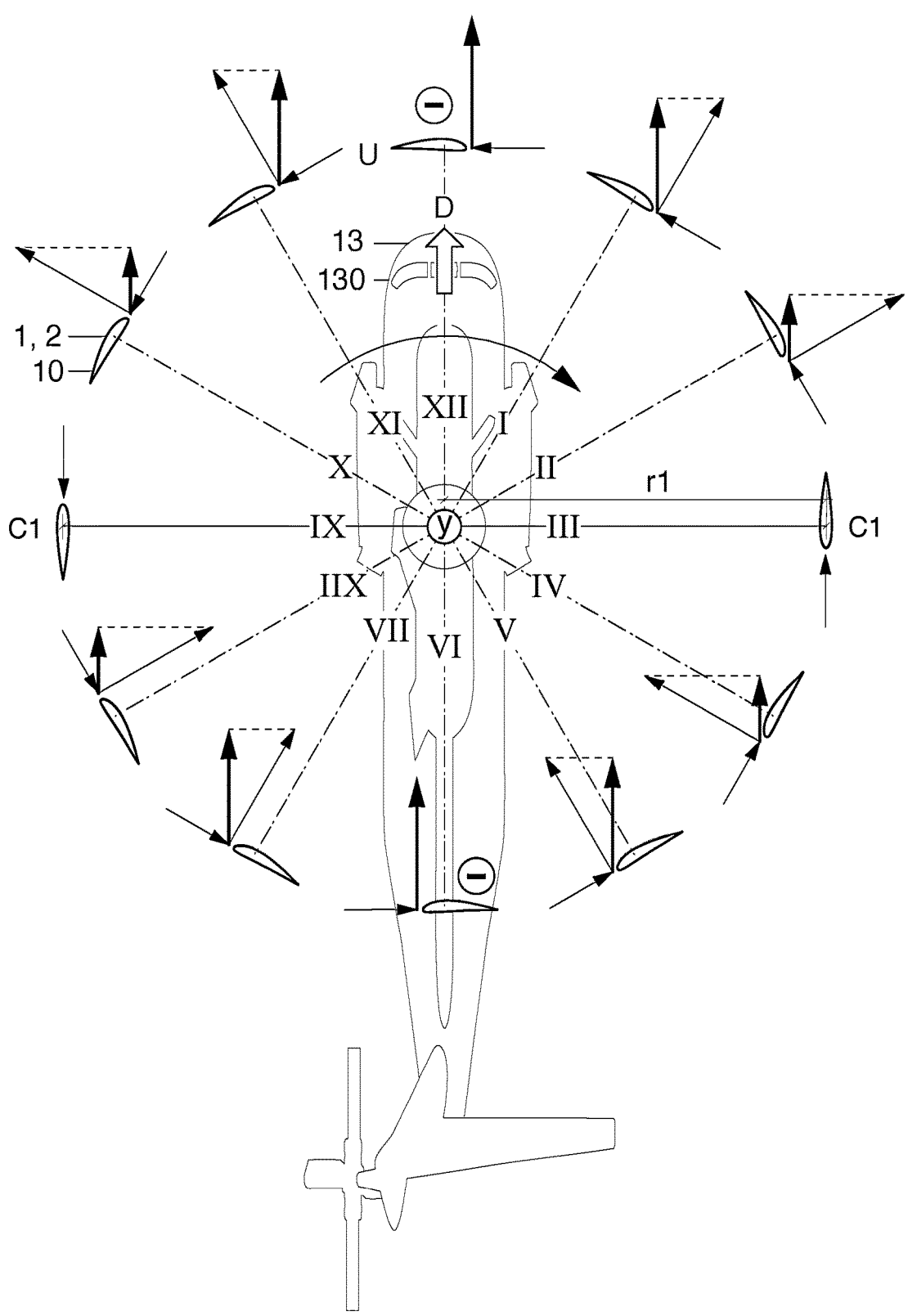
Figure 6:
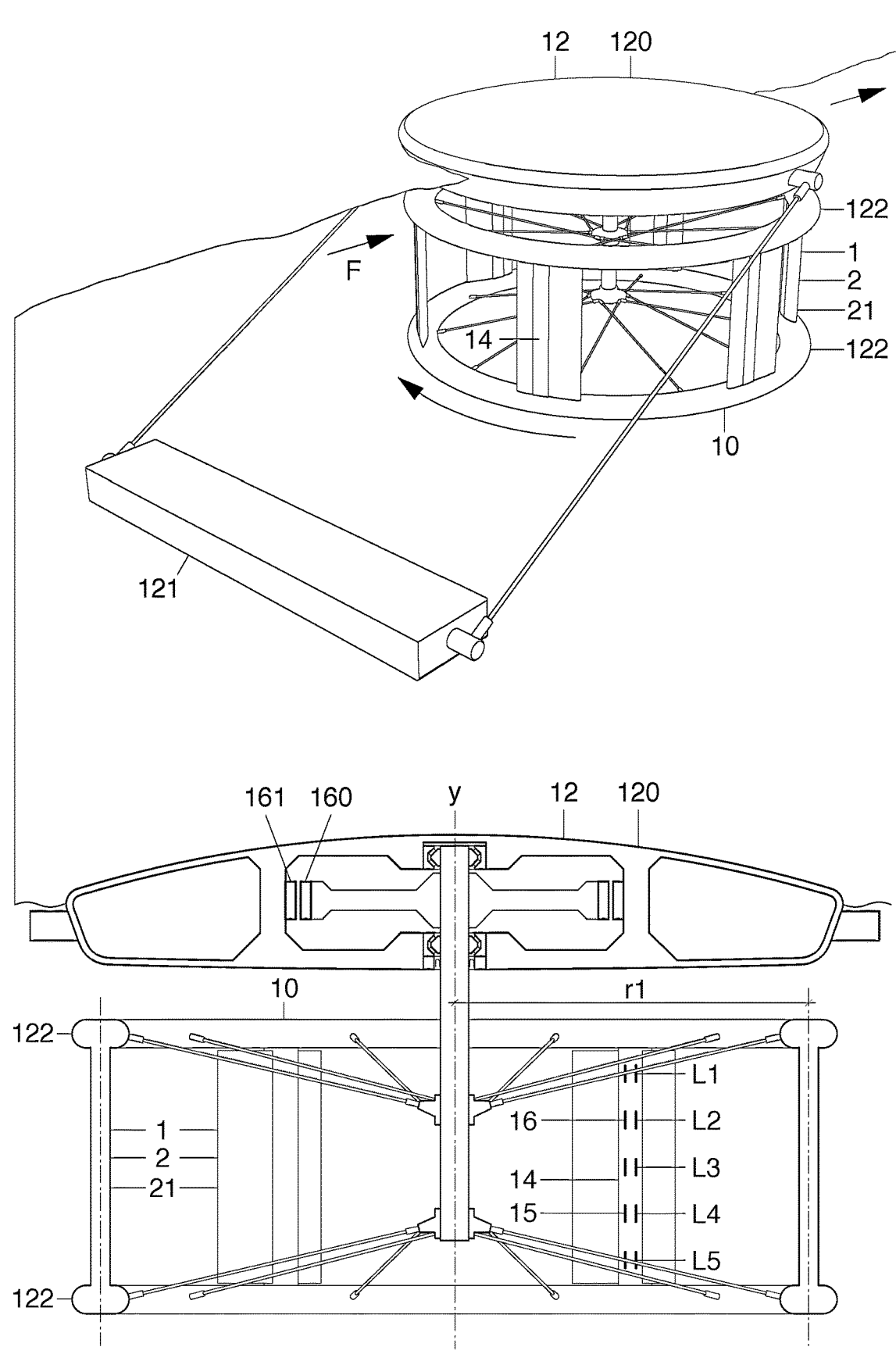
Figure 7:
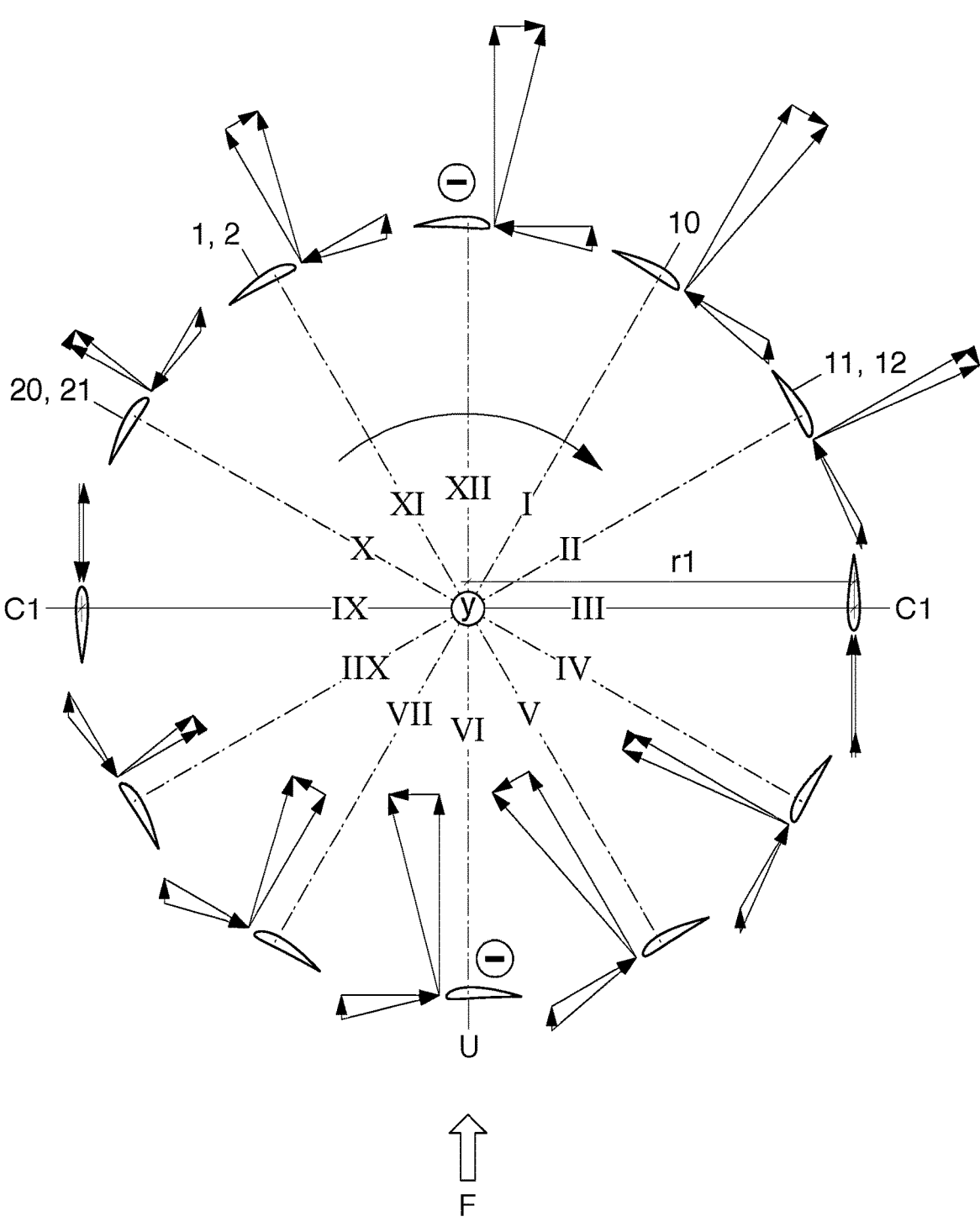
Figure 8:
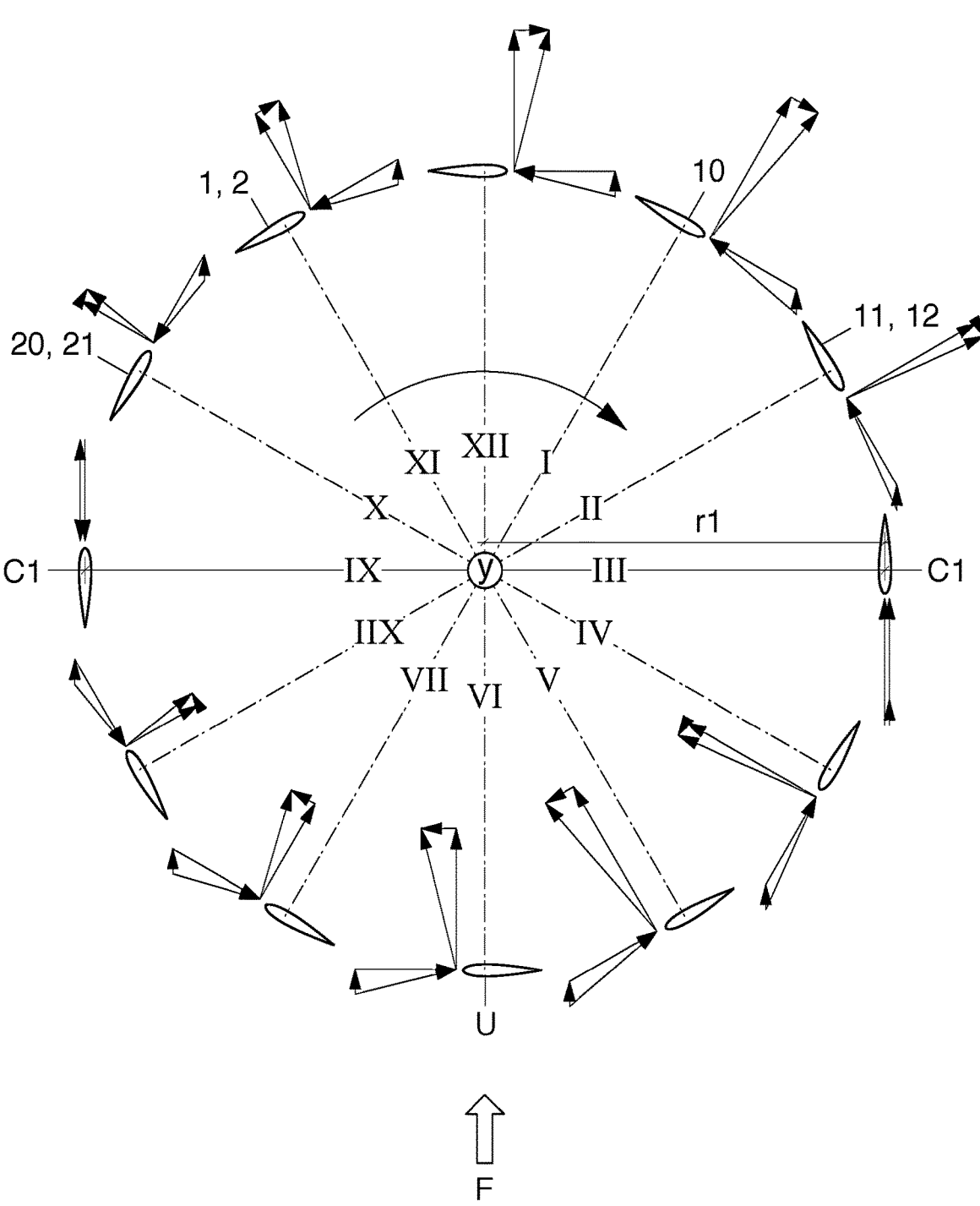
Figure 9:
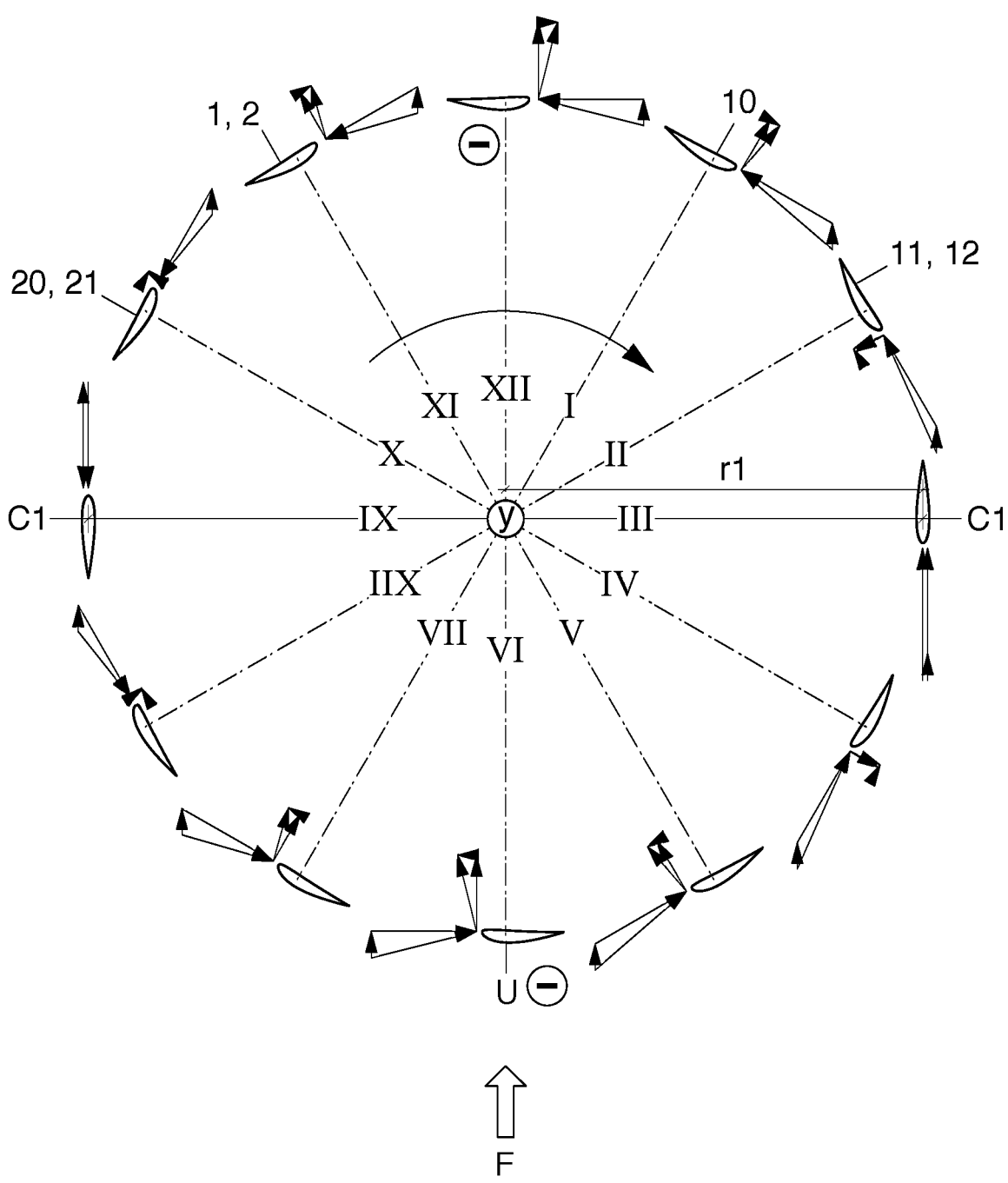
Figure 10:
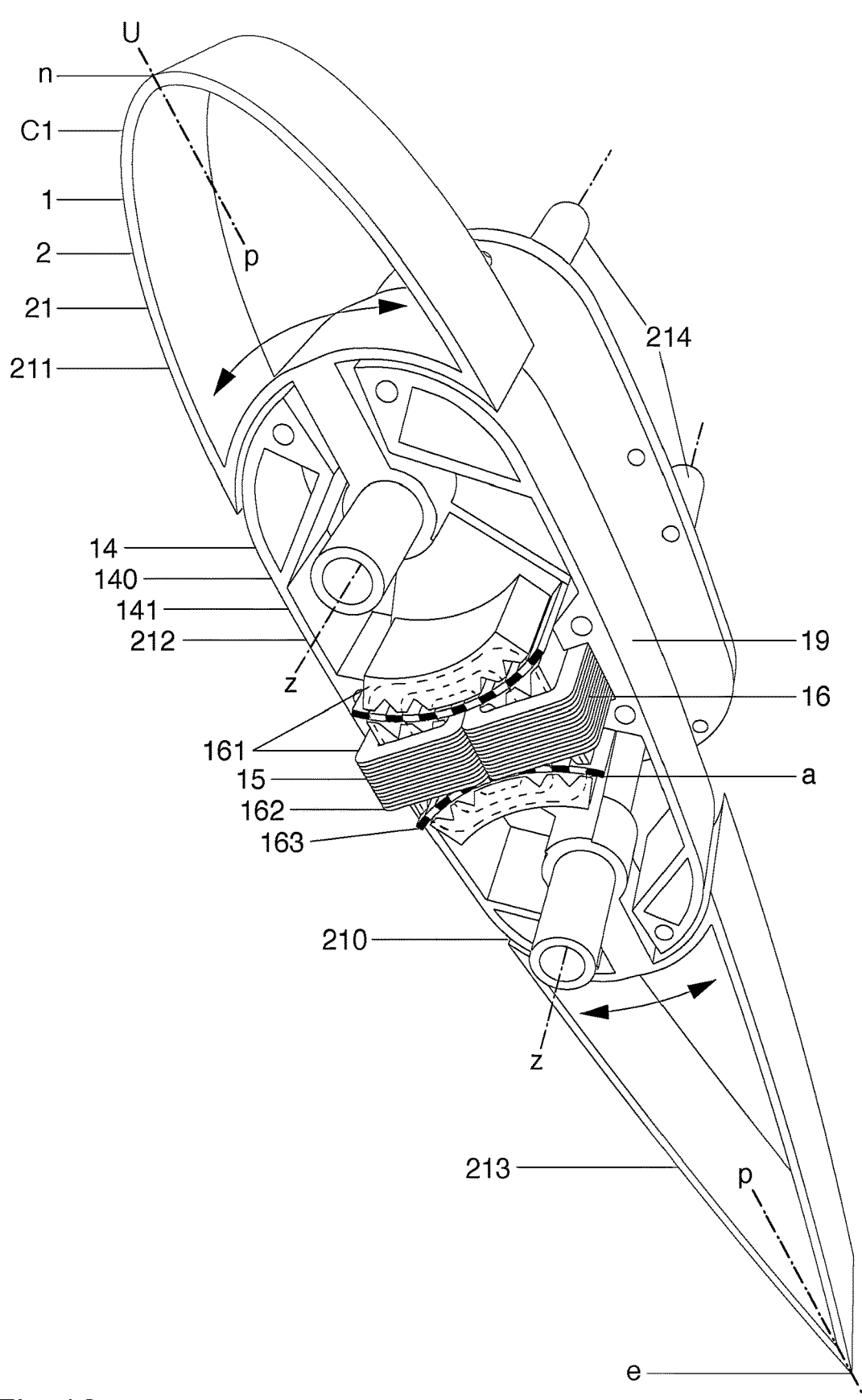
Figure 11:
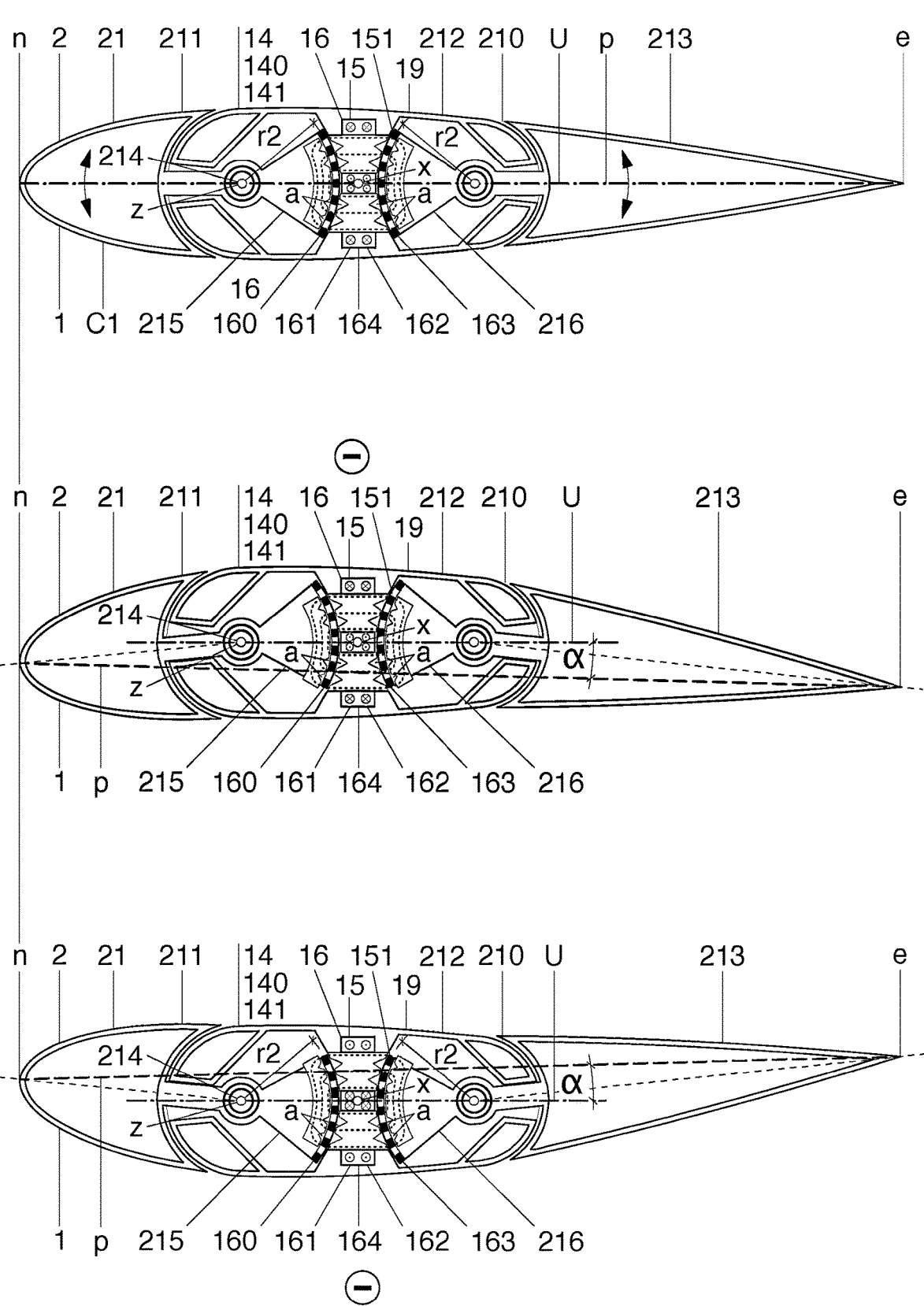
Figure 12:
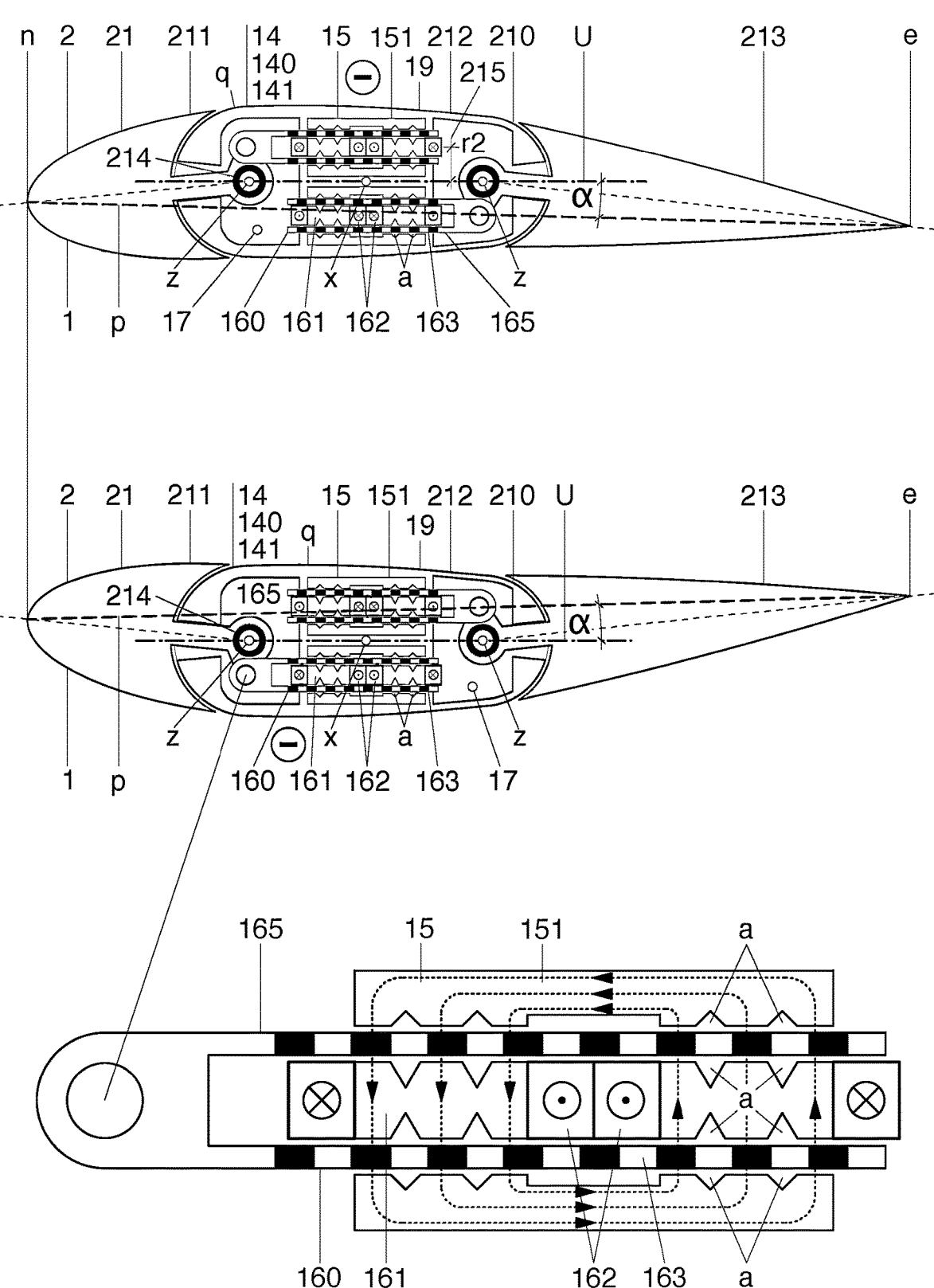
Figure 14:
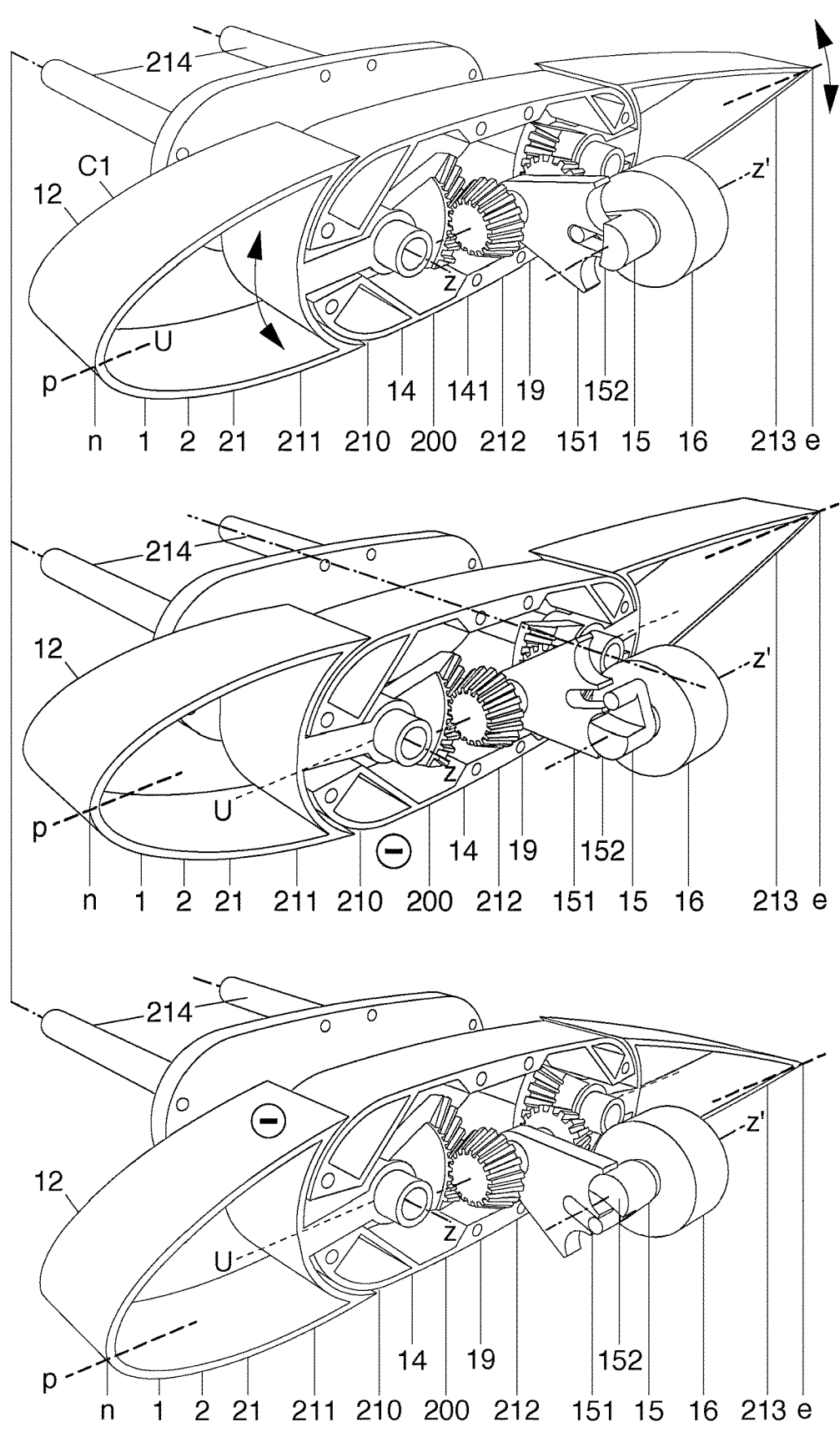
Figure 15:
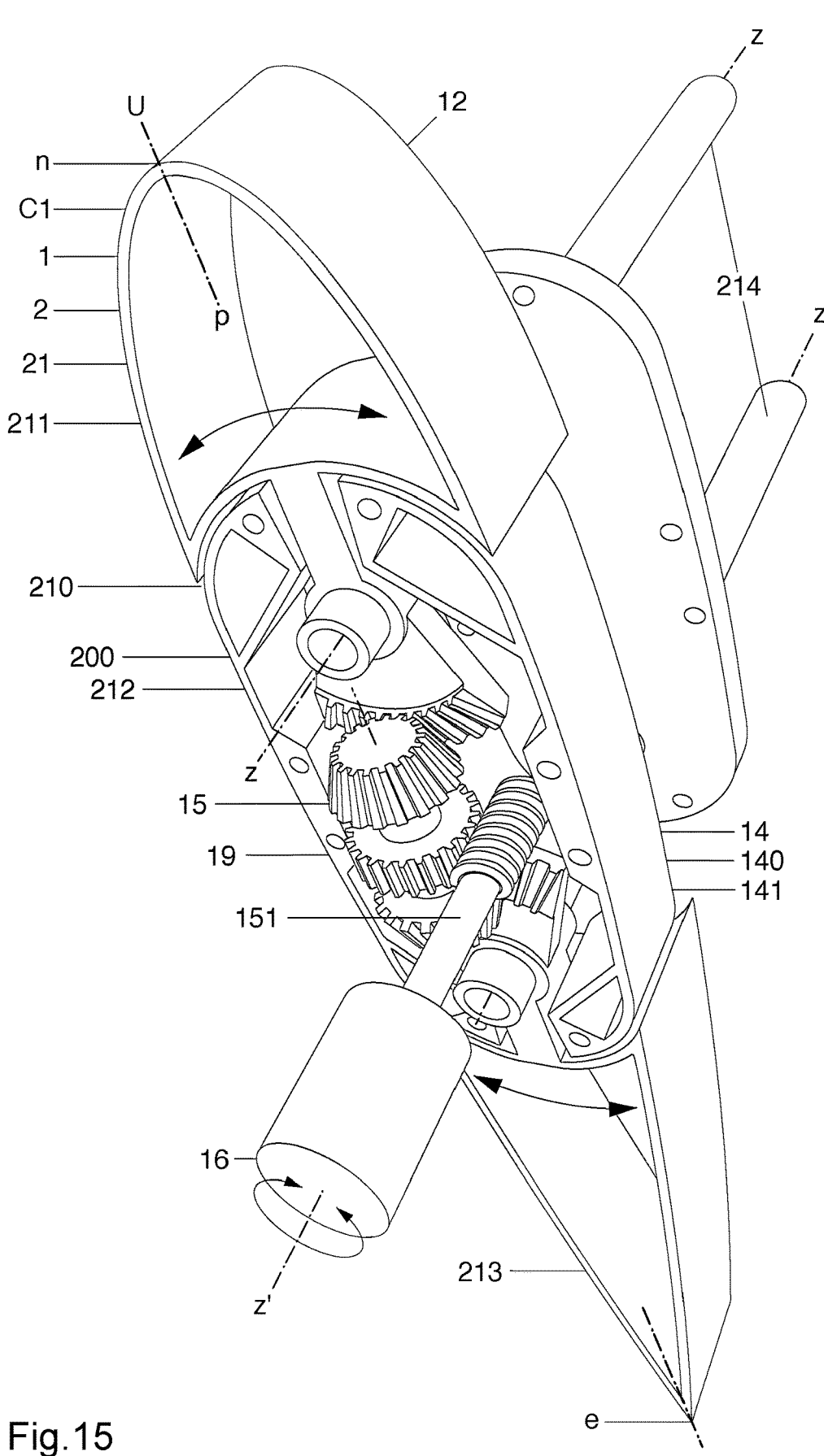
Figure 16:
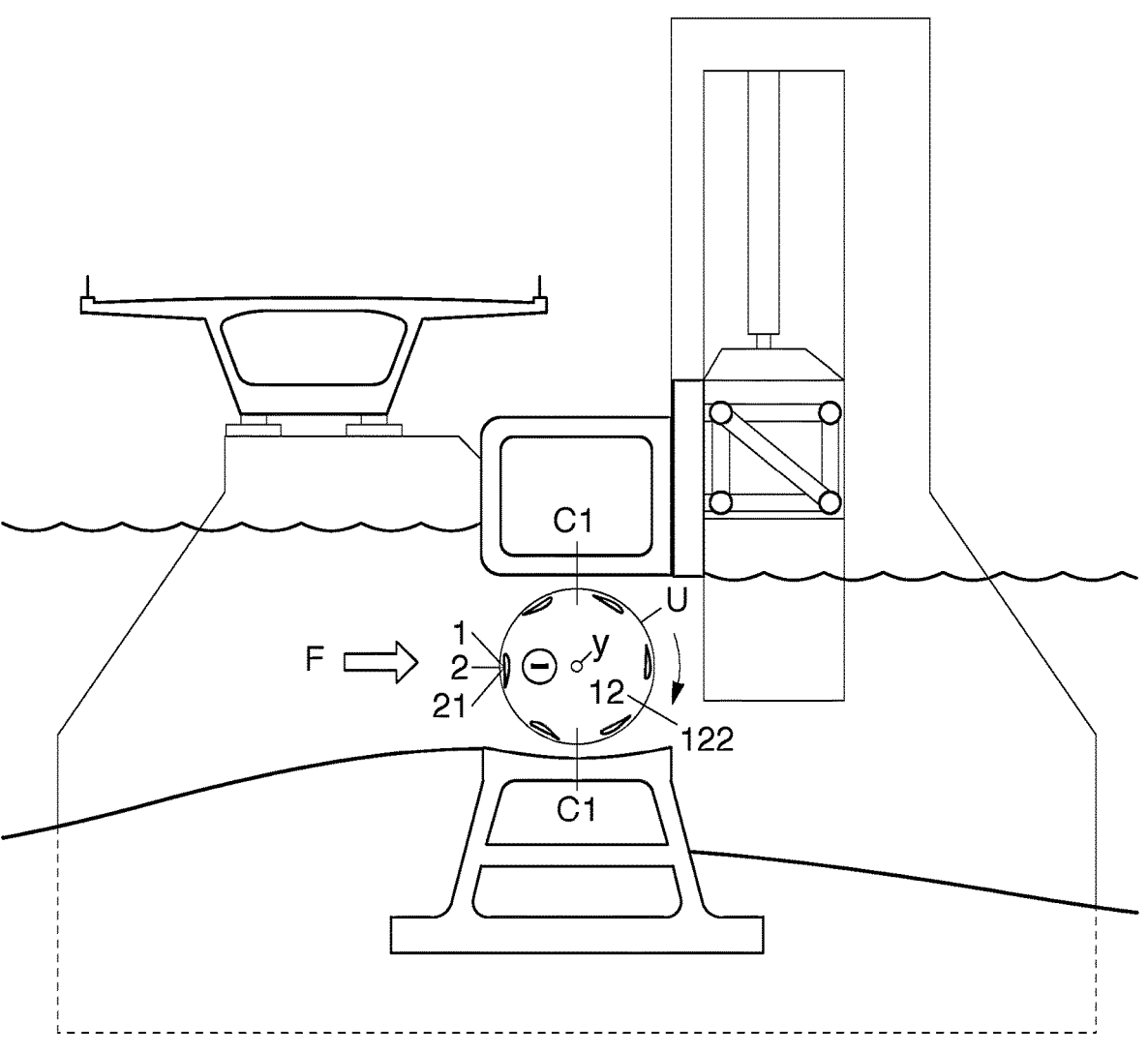
Figure 17:
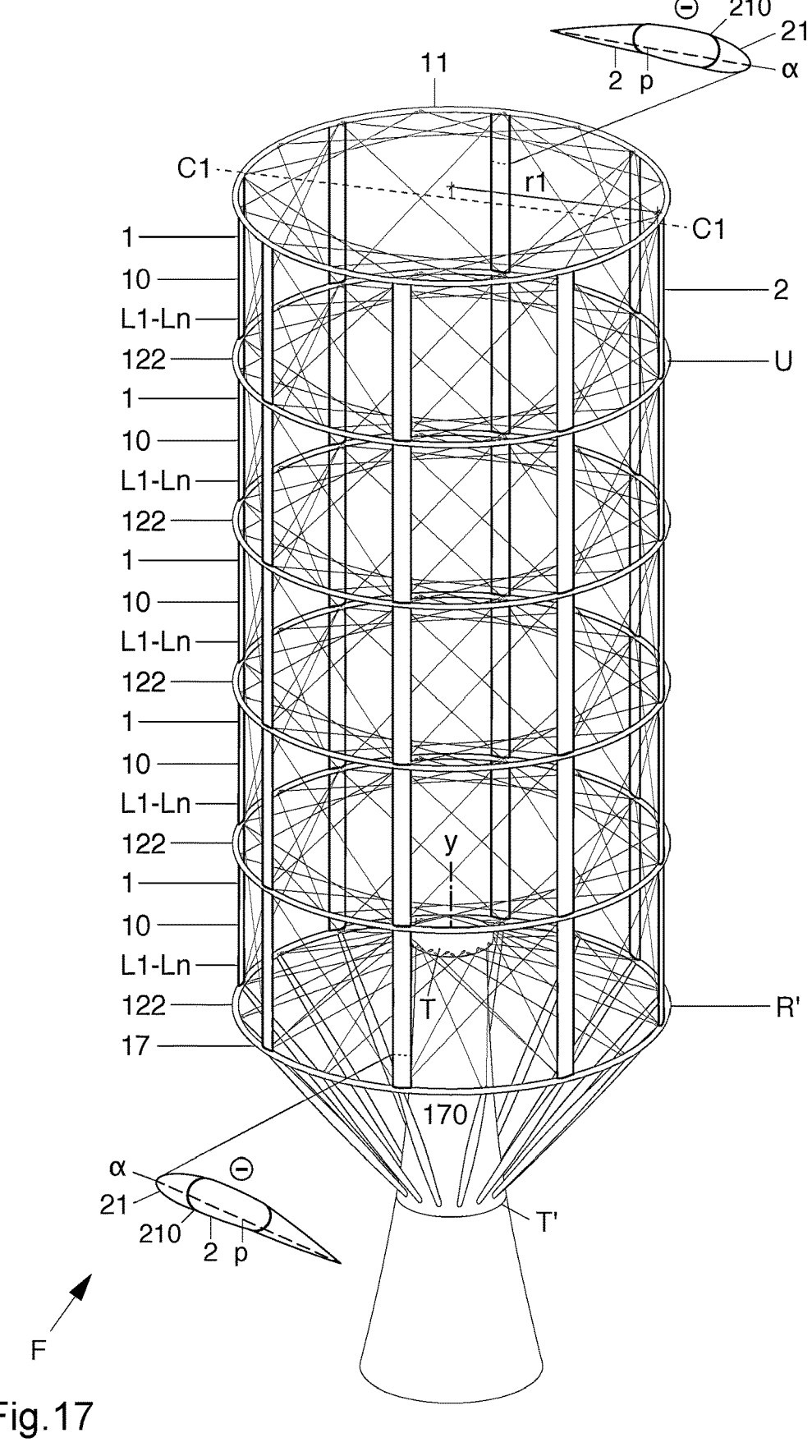
Figure 18:
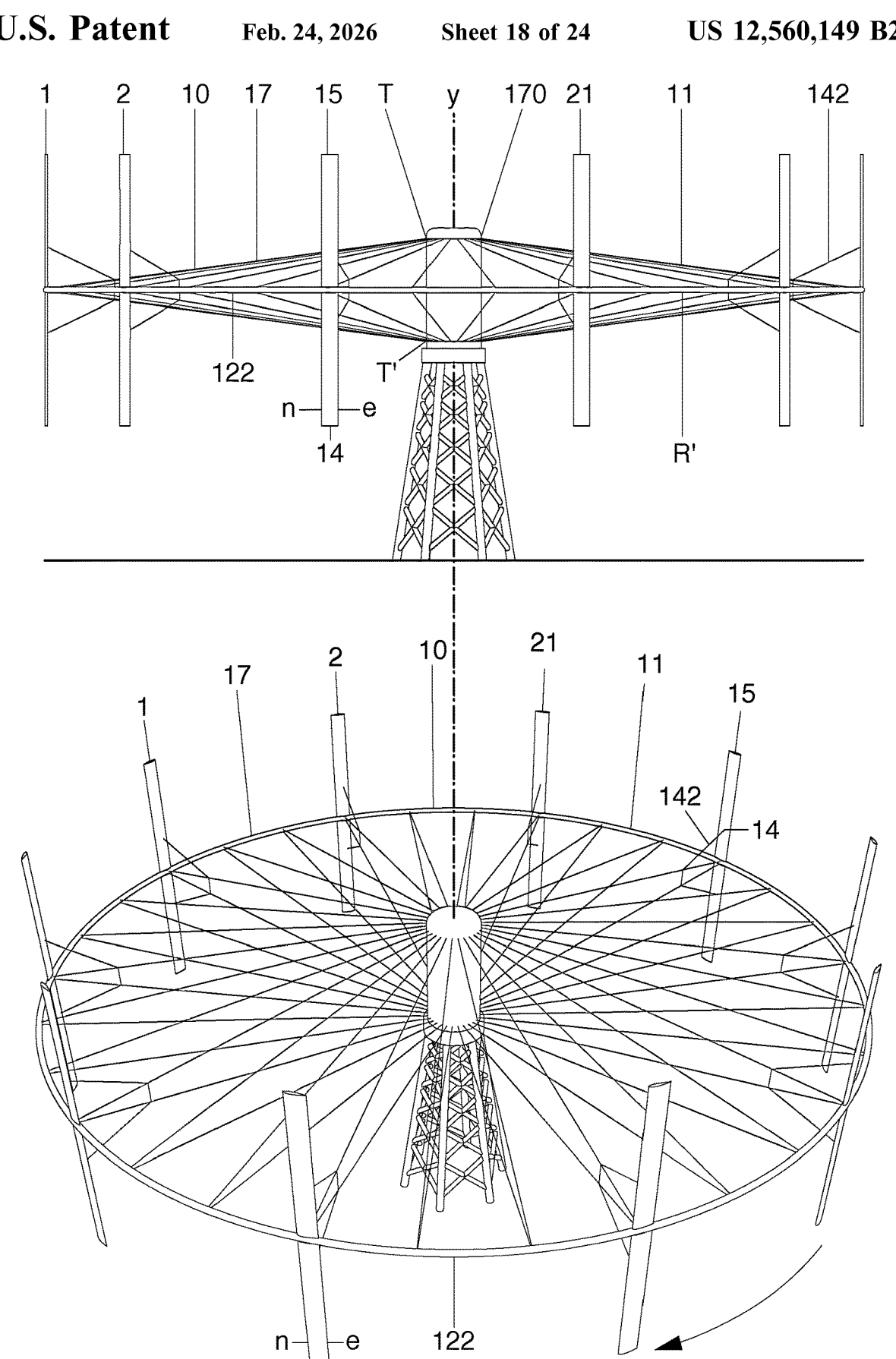
Figure 19:
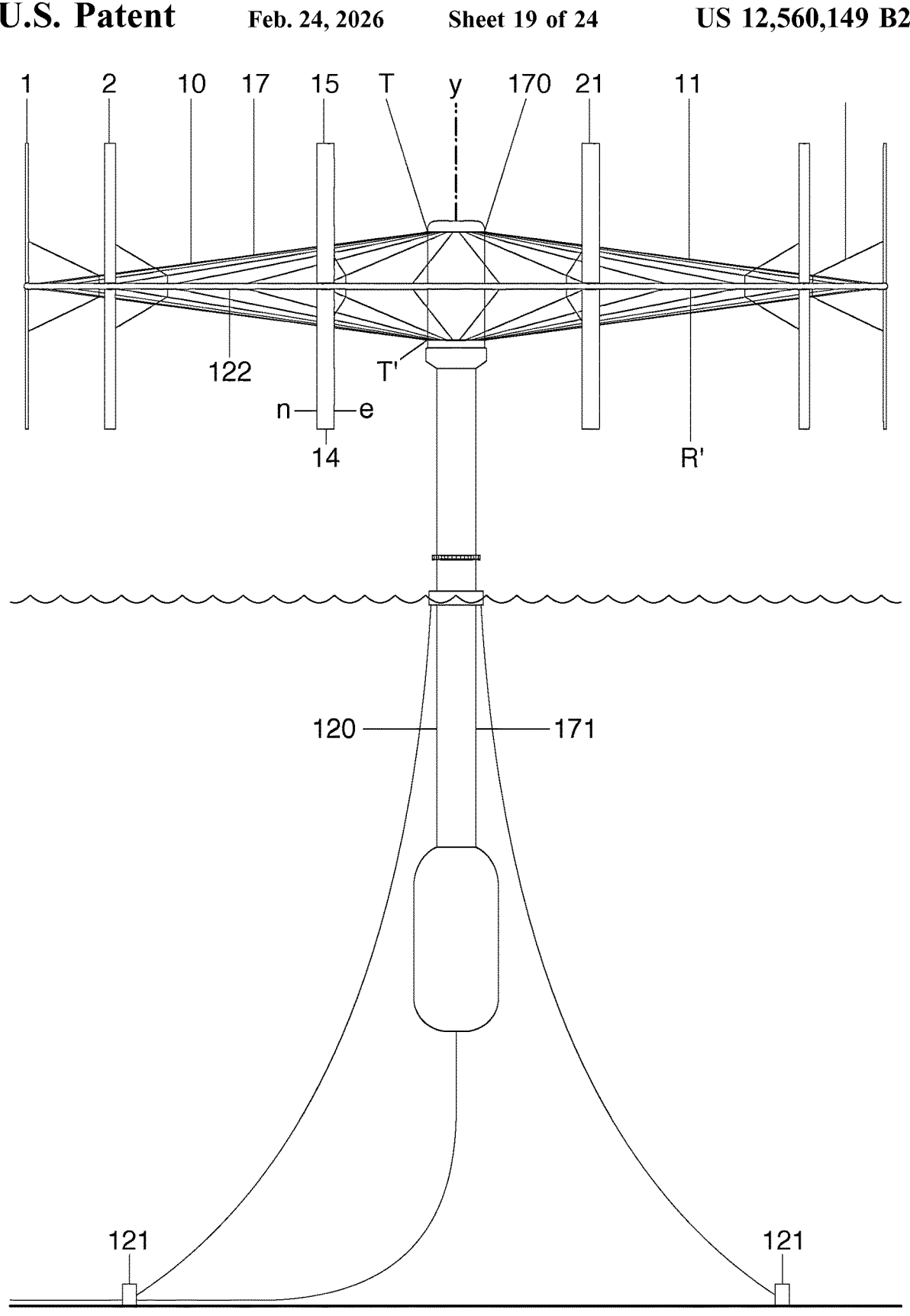
Figure 20:
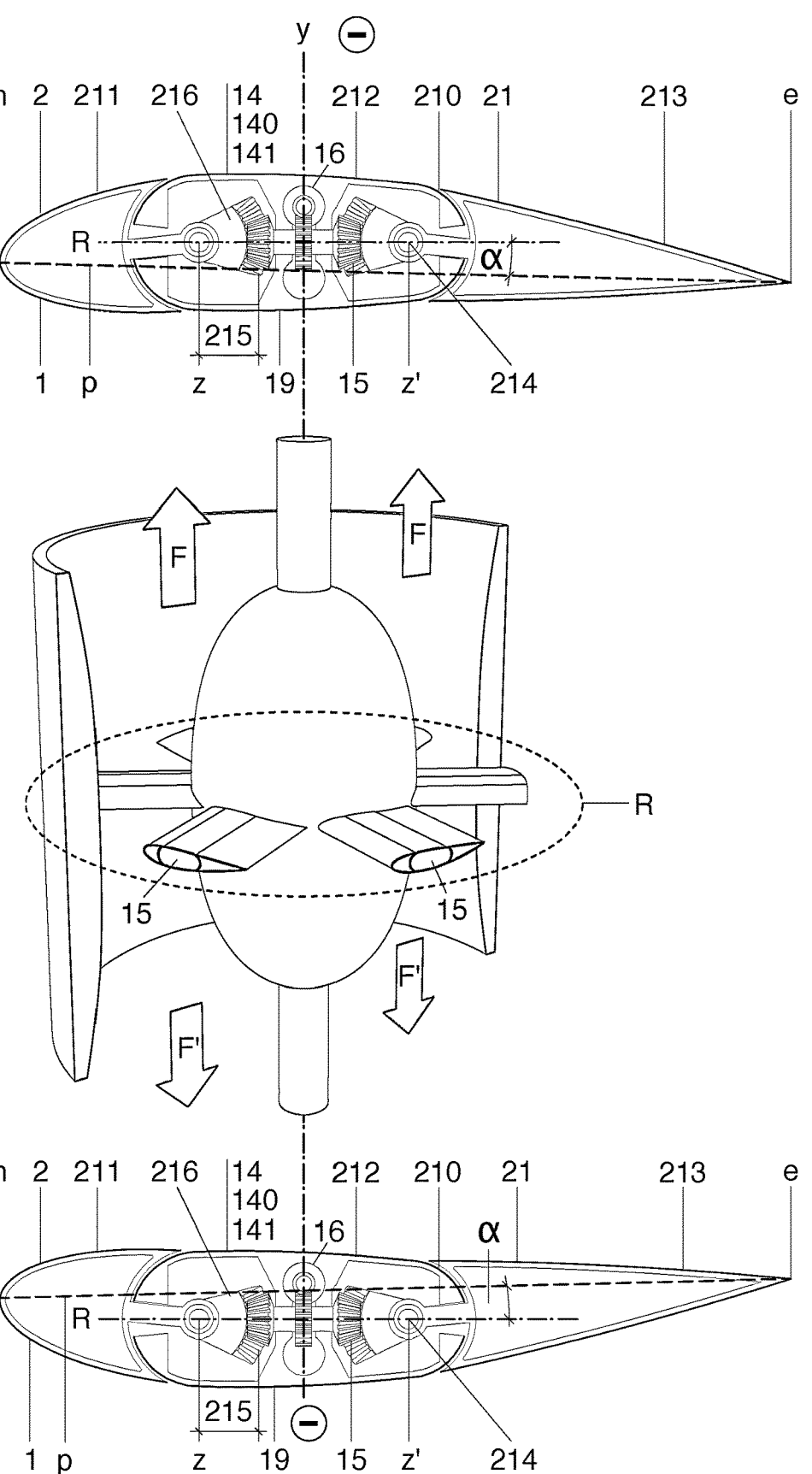
Figure 21:
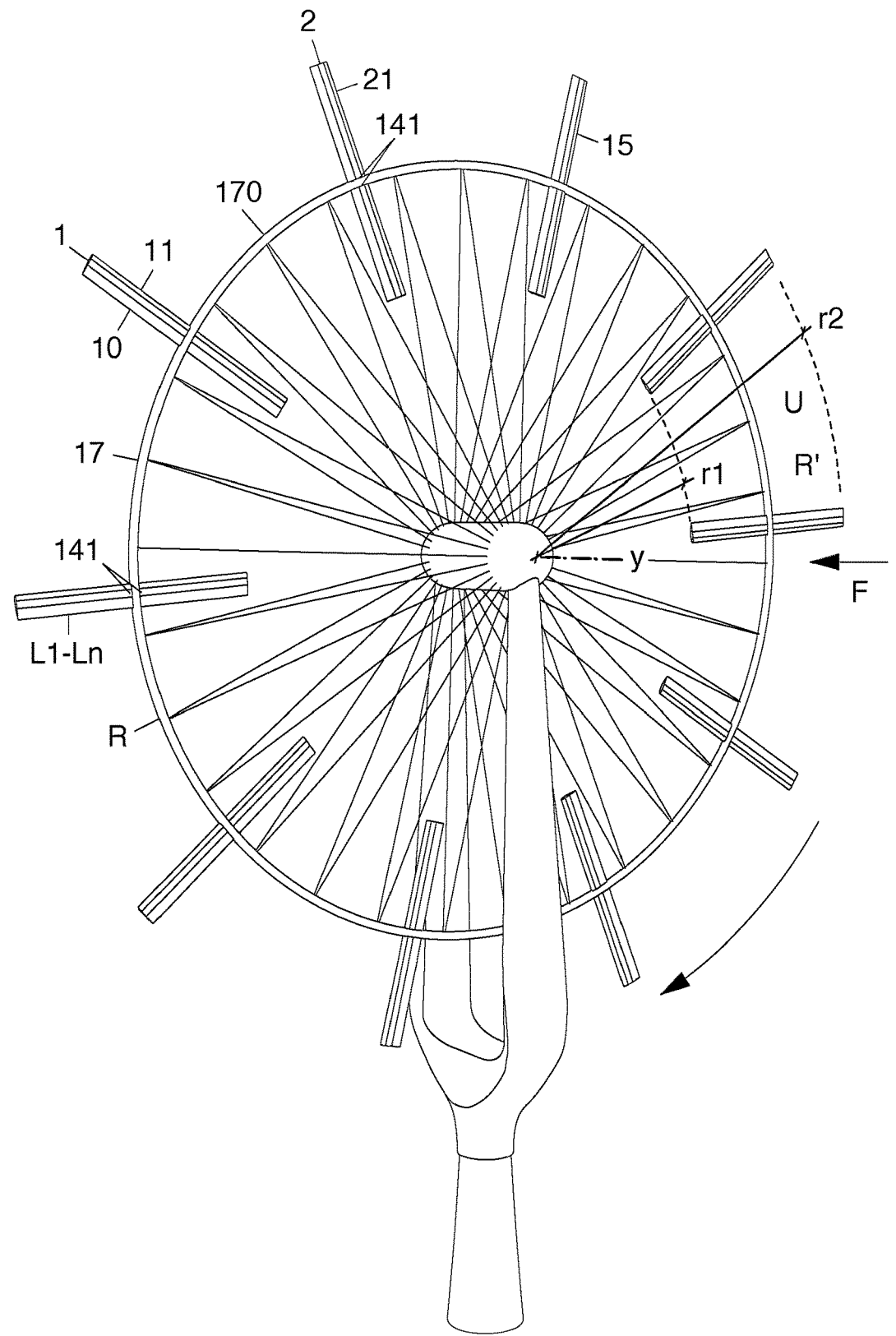
Figure 22:
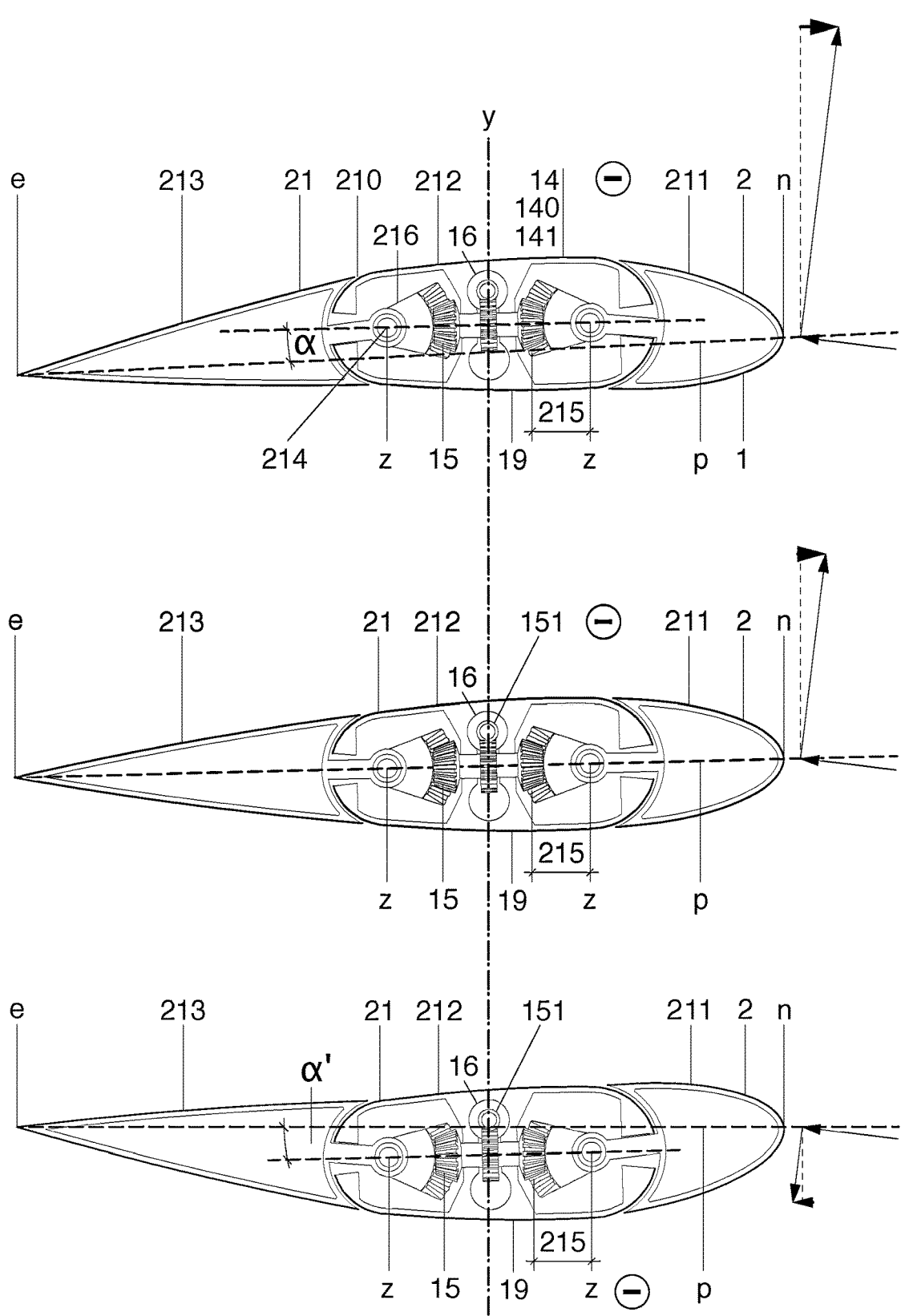
Figure 23:
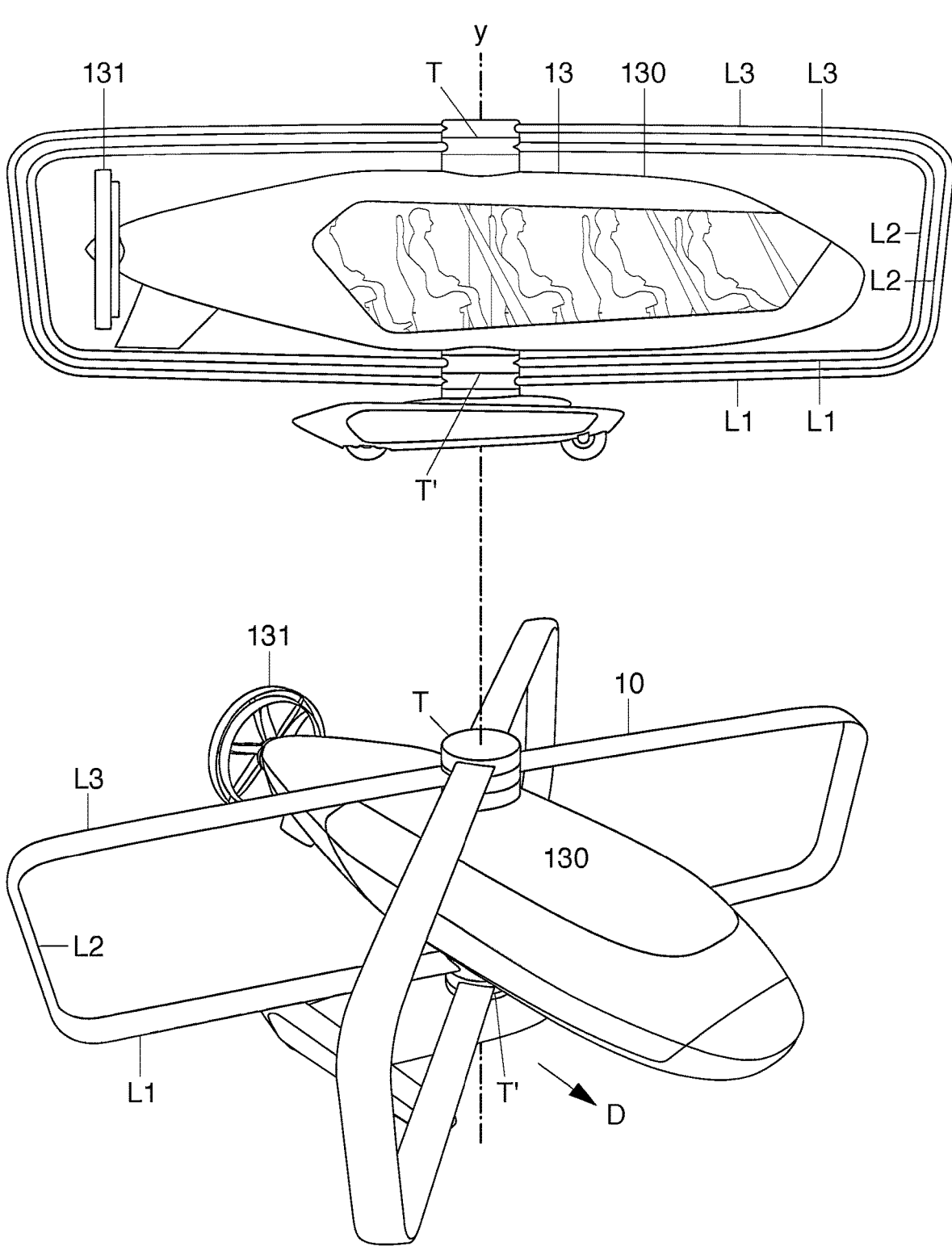
Figure 24:
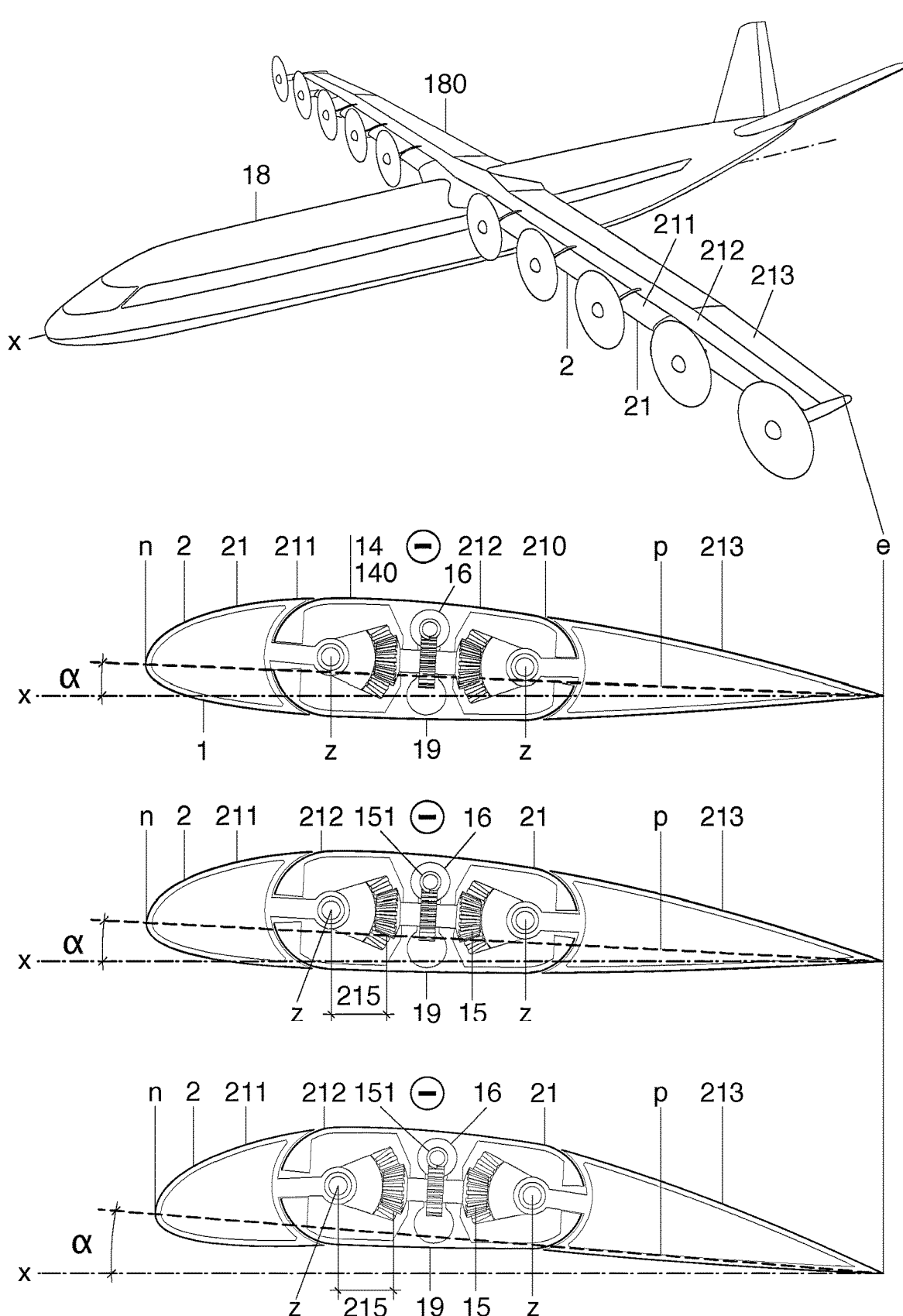

In the figures:

FIG. 1 shows a helicopter with four bow-shaped rotor blades in perspective view and in schematic cross-section, FIG. 2 shows the helicopter according to FIG. 1 with a top view of the lift forces in the lower and upper longitudinal portions of the four bow-shaped rotor blades of the rotor module, FIG. 3 shows a perspective view of a helicopter with two rotor modules, each with four bow-shaped rotor blades, FIG. 4 shows the helicopter shown in FIG. 3 with a top view of the lift forces in the lower and upper longitudinal portions of the bow-shaped rotor blades, FIG. 5 shows the central longitudinal portion of the bow-shaped rotor blades of the helicopters according to FIG. 1-4, with representation of the thrust forces aligned in the direction of flight in schematic horizontal section, FIG. 6 shows a floating water turbine, at top in a longitudinal cross section and at bottom in a schematic cross section, FIG. 7 shows the forces of a wind turbine caused by fluid dynamics at twelve exemplary orbital positions of the variable asymmetrical wing profile in schematic section, FIG. 8 shows reduced, fluid-dynamically induced forces of a wind turbine at twelve exemplary rotation positions of the variable symmetrical wing profile in schematic section, FIG. 9 shows strongly reduced, fluid-dynamically induced forces of a wind turbine at twelve exemplary orbital positions of the variable asymmetrical wing profile in the operating position for storms, FIG. 10 shows an exploded perspective view of a rotor blade at an orbit adjustment position provided for a fully electric blade adjustment of the three-part wing profile, FIG. 11 shows the rotor blade according to FIG. 10 with the fully electric adjusting device for the three-part wing profile, at the top at the adjustment positions of the orbit, in the middle and at the bottom in one half of the orbit with the variable profile chord, in schematic cross-section, FIG. 12 shows a rotor blade with a fully electric adjusting device formed by linear motors for the three-part wing profile, at the top with reversed suction sides for two sectors of the orbit and at the bottom with a schematic longitudinal sectional view of a linear motor, FIG. 13 shows a rotor blade with an electromechanical adjusting device for the three-part wing profile, at top in an overview and at bottom in a detail view of a linear motor, in each case as an exploded isometric view, FIG. 14 shows a rotor blade with an electromechanical adjusting device with a cylinder lock for the three-part wing profile, at the top at the adjustment positions of the orbit, and in the middle and at the bottom in one half of the orbit with exchanged suction sides of the variable wing profile in schematic cross-section, FIG. 15 shows an exploded perspective view of a rotor blade with an electromechanical adjustment and locking device with a worm gear for the three-part wing profile, FIG. 16 shows a storm surge barrier with a water turbine in cross section, FIG. 17 shows a wind turbine with a rotor module formed by a cylindrical lattice shell with a vertical axis of rotation, FIG. 18 shows a wind turbine with a rotor module formed by a spoked wheel with a vertical axis of rotation, FIG. 19 shows a floating wind turbine with a rotor module formed by a spoked wheel with a vertical axis of rotation, FIG. 20 shows in the center a turbine that converts the kinetic energy of a flow that periodically changes direction diametrally into a rotary motion in sectional perspective, and at top shows the variable three-part wing profile for one flow direction and at bottom for the other flow direction, each in cross section, FIG. 21 shows a wind turbine with a rotor module formed by a spoked wheel with a horizontal axis of rotation, FIG. 22 shows a rotor blade of the wind turbine according to FIG. 21 with an electromechanical adjustment and locking device in three exemplary cross sections, FIG. 23 shows a helicopter as a ten-seater aircraft, at top in a perspective view in flight and at bottom in a view after landing, FIG. 24 shows at top an overview of an airplane whose wings have a three-part wing profile, and in the middle and at bottom shows three schematic cross sections of the wing with the variable wing profile.

FIG. 1 shows a helicopter 130 as an exemplary embodiment from the family of rotary-wing vehicles 13 with four bow-shaped rotor blades 1 divided into three longitudinal portions L1-L3, each of which has a three-part wing profile 21. The longitudinal members of the bow-shaped rotor blades 2 are formed by the central wing segment 212 of the variable wing profile 2 and form a housing 14 with an abutment 140 for the front wing segment 211, which is connected in an articulated manner to the central wing segment 212 by means of the adjusting device 15, and for the rear wing segment 213; cf. FIG. 10. As shown in FIG. 2, the lower longitudinal portion L1 running ahead in the direction of rotation and the upper longitudinal portion L3 running behind in the direction of rotation of a rotor blade 1 are designed to generate lift and thrust in the direction of flight D, while the longitudinal portion L2 is designed to hold the helicopter 130 in hovering flight in its flight position with a thrust force that can be controlled in a radius of 360 degrees in each direction. The thrust force in the longitudinal portions L2 of the diameters can be oriented in any flight direction D with the adjustment positions C1. The rotor module 10 is connected to a drive mechanism via a shaft and has an axis of rotation y, which is formed by the vertical axis of the helicopter and rotates above the cabin enclosed by the fuselage. The rotary wing kinematic characteristic of the variable wing profiles 2 of the rotor blades 1 replaces a swash plate, wherein, as shown in FIG. 2, in straight-ahead flight the diameter is aligned with the adjustment positions C2 in the lower and upper longitudinal portion L1, L3 of the bow-shaped rotor blade 1 in the direction of flight D in order to generate the same amount of lift with a different positive angle of attack α of the profile chord p in the left and right half of the rotor module 10 with respect to the direction of flight D and to generate thrust in the direction of flight D by tilting the rotor module 10. The lower longitudinal portion L1 running ahead in the direction of rotation and the upper longitudinal portion L3 running behind in the direction of rotation are vertically spaced apart by the longitudinal portion L2 and radially offset from each other by approximately 10 degrees with the offset angle β, wherein the central longitudinal portion L2 connects the outer lower end of the longitudinal portion L1 to the outer upper end of the longitudinal portion L3 at an angle. With two layers of lift-generating longitudinal portions L1, L3 of the rotor blades 1, the helicopter 130 can advantageously be used as a cargo helicopter that can maintain a stable position in hover flight and develop thrust in any direction from a standing position. Without a swashplate, the rotor module 10 is characterized by very smooth running and is free of unwanted vibrations.

FIG. 2 shows the helicopter 130 according to FIG. 1 with a schematic diagram of the longitudinal portions L1, L3 of the bow-shaped rotor blades 1, at the top in an overview and at the bottom in detailed sections of the asymmetrical wing profile 2, in each case for the left and the right half of the orbit U, relative to the direction of flight D. When the helicopter 130 is flying straight ahead, the resulting incident flow is determined by the rotational speed and the flight speed, so that different lifting forces, shown as dashed vectors, would result at the rotor blades 1 in the left and right half of the orbit U with respect to the flight direction D. The wing adjustment described in FIG. 1 at the adjustment positions C2 of the leading and trailing longitudinal portions L1, L3 of the rotor blades 1 generates the same lift forces in the left and right halves of the rotor module 10, so that the helicopter 130 assumes a stable flight attitude in straight-ahead flight. In the longitudinal portion L2 with the adjustment positions C1 of the rotor blade 1, a wing adjustment is provided, as shown in FIG. 5, in which the thrust force can be directed in any flight direction D within a radius of 360 degrees. This is particularly advantageous for a precise landing approach and also for maintaining a determined flight position, e.g. in crosswinds. In climbing flight, the sum of the lift forces in both halves of the orbit U is the same, so that no adjustment of the wing segments 211, 213 is required in the longitudinal portions L1, L3 of the rotor blade 1 in climbing flight.

FIG. 3 shows a helicopter 130 with two rotor modules 10 rotating in opposite directions about the axes of rotation y. The front and rear rotor modules 10 each have four bow-shaped rotor blades 1, which are subdivided into a lower longitudinal portion L1 running ahead in the direction of rotation and an upper longitudinal portion L3 running behind in the direction of rotation, as well as into a longitudinal portion L2 connecting the upper and lower longitudinal portions L1, L3 to one another and preferably inclined in the direction of rotation, and have a continuous support profile 14 formed by the central wing segment 212. As explained in FIG. 1, the diameter is aligned with the adjustment positions C2 in the direction of flight, so that by changing the positive angle of attack α of the chord p of the variable wing profile 2 in straight-ahead flight of the helicopter 130, the rotor modules 10 generate the same lift forces on the starboard and port sides, the front and rear rotor modules 10 being inclined in the direction of flight D. The offset angle β between the lower longitudinal portion L1 and the upper longitudinal portion L3 ensures an optimum incident flow to the four rotor blades 1 of the rotor module 10. In the longitudinal portions L2 of the bow-shaped rotor blades 1 aligned parallel to the axes of rotation y of the helicopter 130, the diameter with the adjustment positions C1, as shown in FIG. 5, is aligned transverse to the flight direction D, so that the suction sides (–) of the variable wing profile 2 in the longitudinal portion L2 of the rotor blades 1 generate thrust in the flight direction D. The helicopter module proposed here has the advantage that the rotor modules 10 at the nose and tail are not offset in height in relation to one another, as has been standard up to now, but can be arranged at the same height in relation to the distance to the longitudinal axis, as the orbits U do not intersect one another. The two-layer arrangement of the radial longitudinal portions L1, L3 results in a significantly large wing surface area, which can generate high lift forces, so that the helicopter 130 is particularly suitable as a cargo helicopter. The smooth transition of the angle of attack α at the adjustment positions C1 and C2 results in quiet rotor operation and avoids vibrations transmitted to the entire structure compared to the abrupt change of the angle of attack α by means of a swash plate of the rotor, which was previously common. An assumed wing speed of 800 km/h for the central longitudinal portion L2 of the bow-shaped rotor blade 1 with a radius r1 of 5 m results in 440 revolutions of the rotor module 10 per minute and a frequency of 20 Hz for the adjusting device of the rotor blade 1 in the longitudinal portion L2. The electromotive adjusting devices shown in FIG. 10-13 fulfill this requirement.

FIG. 4 shows the helicopter 130 according to FIG. 3 in a top view of the twin rotors with vectorial representation of the forces caused by fluid dynamics on a rotor module 10 in the longitudinal portions L1, L3 of the bow-shaped rotor blades 1 and with detailed sections of the variable asymmetrical wing profile 2, in each case for the right and left half of the orbit U in relation to the flight direction D. In straight-ahead flight of the helicopter 130, the resulting incident flow is composed of the rotational speed and the flight speed, so that different lift forces result on the rotor blades 1 in the left and right half of the orbit U with respect to the flight direction D, which are compensated for at the diameter oriented in the flight direction D with the adjustment positions C2 by the fact that the positive angle of attack α of the profile chord p changes twice in one revolution of the rotor blade 1 and therefore an equally large lift force is produced in the starboard and port halves of the two rotor modules 10. In the longitudinal portion L2 of the rotor blade 1, as shown in FIG. 5, a wing adjustment is provided in which the thrust force can be directed in any flight direction D within a radius of 360 degrees. This is particularly advantageous for a precise landing approach and also for maintaining a determined flight position, e.g. in crosswinds. In climbing flight, the sum of the lift forces in both halves of the orbit U is the same, so that no adjustment of the angle of attack α of the profile chord p is required in the longitudinal portions L1, L3 of the rotor blade 1 in climbing flight.

FIG. 5 shows the straight-ahead flight of the helicopter according to FIG. 1-4 in a schematic horizontal section of the longitudinal portion L2. The diameter with the orbital positions I-XII can be aligned in the longitudinal portion L2 in any position of two opposite positions C1 of the orbit U. While the rotor blades 1 generate lift in the longitudinal portions L1, L3, as shown in FIG. 2 to 4, the longitudinal portion L2 is used to generate a thrust force that can be directed in any flight direction D within a radius of 360 degrees. When there is no wind, the adjusting device 15 of the rotor blades 1 is switched off in the longitudinal portions L2 in static flight, so that the thrust forces caused by the variable asymmetrical wing profiles 2 cancel each other out. By means of the adjusting device 15 of the rotor blades 1, the helicopter 130 is very easy to control and can maintain its flight position very precisely even in strong crosswinds and, as shown here, accelerate from a standstill in flight direction D, which is also particularly advantageous for takeoff and landing.

FIG. 6 shows a floating water turbine 12 that is anchored to the bottom of a body of water with a current F and has a disk-shaped floating body 120 on the water surface, which is anchored to the bottom of the body of water by means of an anchor 121 and anchor cables. The housing 14 of the motor generator is rigidly connected to the disk-shaped floating body 120. The shaft of the motor generator has, for example, an upper and a lower, watertight tapered roller bearing and is clamped to the floating body 120 and connected to a rotor module 10 in a torsionally rigid manner by means of two vertically spaced-apart sets of radial blade spokes. The rotor module 10 rotates on a circular orbit U with the radius r1 about the axis of rotation y and has six rotor blades 1, the longitudinal members of which are each connected to an upper and a lower ring support 122 of the submerged rotor module 10 and form a housing 14 for the adjusting device 15. To accommodate the adjusting devices 15 of the variable wing portion 2, the longitudinal members of the three-part wing portions 21 are subdivided into five longitudinal portions L1-L5 and form the abutment 140 and the housing 14 for the adjusting devices 15 assigned to the longitudinal portions L1-L5. The water turbine 12 is anchored in the flowing water by means of anchor cables (not designated) for the anchor 121 and by means of joints on the disk-shaped floating body 120 anchored in the current F in such a manner that the turbine can follow different water levels.

FIG. 7 shows twelve different orbital positions I-XII of the variable asymmetrical wing profile 2 of the rotary-wing turbines 11.12 on the orbit U defined by the radius r1. In relation to the direction of the flow F, the suction side (−) of the variable asymmetrical wing profile 2 is aligned to the inside of the orbit U on the windward side and to the exterior side of the orbit U on the leeward side, so that in the case of a wind turbine 11 as a Clark YM-15 profile, the variable wing profile 2 produces a tangential drive force at wind forces 3-6, indicated by arrows in the direction of rotation. At the diameter with the adjustment positions C1, the suction side (−) of the variable wing profile 2 changes from the outside to the inside of the orbit U and vice versa, wherein the variable wing profile 2 always has a symmetrical wing profile 2 in a transitional position. In windward and leeward rotation, the resulting incident flow as a vector sum of the flow speed and the rotational speed of the rotor module 10 therefore causes a lifting force inclined in the direction of rotation, which is approximately one-third greater with the asymmetrical wing profile 2 than with the symmetrical wing profile 2 considered in FIG. 8. This results in a substantially improved efficiency of the rotary wing turbine, which can be designed as a wind or water turbine 11, 12, compared to a conventional Darrieus rotor. In the case of a large wind turbine 11 with a rotor diameter of two hundred meters, the rotation time of rotor blade 1 is more than half a minute, so that there is sufficient time for wing adjustment at the adjustment positions C1. In contrast to a Darrieus rotor, in which a sudden load change at the adjustment positions C1 is disadvantageous and places extreme stress on the structure of the wind turbine 11, the gradual wing adjustment described here reduces aerodynamically induced load peaks at the adjustment positions C1, so that the structure of the wind turbine 11 is relieved of stress.

FIG. 8 shows twelve different orbital positions I-XII of the variable asymmetrical wing profile 2 of the rotor blades 1 for the wind and water turbines 11, 12 with a symmetrical wing profile 2 shown in FIG. 7. For the wind turbine 11 designated in FIG. 7, this unitary rotor blade position is provided for wind forces 6-9 according to the Beaufort scale in order to utilize a lifting force d reduced by one-third for the operation of the wind turbine during storms. Compared to the wing positions of the rotor blades 1 shown in FIG. 7, the variable wing profile 2 as a symmetrical wing profile 2 results in a lower lift force and a resulting reduced tangential drive force.

FIG. 9 shows twelve different orbital positions I-XII of the variable asymmetric wing profile 2 of the rotor blades 1 for the rotary-wing turbines shown in FIG. 7 and FIG. 8. The variable asymmetrical wing profile 2 of the wind turbine 11 shown in FIG. 7 shows an inverse position with a negative angle of attack of the chords of the asymmetrical wing profiles 2 compared to the orientation of the suction sides (−)

of the asymmetrical wing profile 2 described in FIG. 7. In relation to the direction of the flow F, the suction side (−) of the asymmetrical wing profile 2 in the form of a Clark-YM-15 wing profile is oriented towards the exterior side of the orbit U in the windward orbit and towards the interior side of the orbit U in the leeward orbit, so that the variable wing profile 2, with the exception of the adjustment positions C1, causes a reduced tangential drive force at extreme wind forces 9-12 according to the Beaufort scale at orbital positions V-VIII and X-I, which is countered by a tangential resistance acting against the direction of rotation at orbital positions III, IV and IX. However, since the tangential drive force predominates, the wind turbine 11 rotates according to the Saffir-Simpson hurricane scale during a gale and even during a hurricane, and converts part of the kinetic energy of the storm into a rotary movement, which is an advantage over a standstill of the wind turbine 11.

FIG. 10 shows an exploded perspective view of a rotor blade 1 with a symmetrical variable wing profile 2, for a rotary-wing vehicle 13 with reference to FIG. 5, in which the diameter in the central longitudinal portions L2 of the bow-shaped rotor blades 1 can be aligned with the adjustment positions C1 orthogonally to the respective flight direction D, and for a wind or water turbine 11, 12 with reference to FIG. 7, in which the diameter with the adjustment positions C1 can be aligned perpendicularly to the direction of the flow F in each case. In both cases, the variable wing profile 2 temporarily has a symmetrical wing profile 2 at the adjustment positions C1, which is aligned mirror-symmetrically to the chord p and to a tangent to the orbit U with the radius r1. The rotor blade 1 is made up of three rigid extruded hollow profiles 141, which consist of a front wing segment 211 with a wing leading edge n, a central wing segment 212 in the area of the maximum profile thickness q and a rear wing segment 213 with a trailing edge e. The central wing segment 212 is designed as a housing 14 for an adjusting device 15 formed by electric motors 16 arranged in pairs. The front and rear wing segments 211, 213 are connected in an articulated manner to the central wing segment 212, which is formed by an extruded hollow profile 141. The central wing segment 212 forms a housing 14 and an abutment 140 for two stators 161 with laminations 162 and exciter windings and, with an air gap a on both sides, establishes a contactless electrical connection to the rotor 160 of a sectionally acting stepper motor 164 formed by alternately poled permanent magnets 163. As explained in more detail in FIG. 11, the front and rear wing segments 211, 213 are rotated in and out about the axes of rotation z by reversing the polarity of the exciter windings 162 on the two laminations of the stator 161. Together with the permanent magnets 163, the rotors 160 form a counterweight 216 to the front and rear wing segments 211, 213, so that an equilibrium of forces prevails during rotation. For a rotor module with a diameter of 3 meters and 800 revolutions per minute, up to 40 load changes per second result, which can be achieved within 3.2 milliseconds with this fully electric adjusting device 15.

FIG. 11 shows the rotor blade 1 according to FIG. 10 in three schematic cross-sections, at the top at the adjustment positions C1 of a diameter of the orbit U with the radius r1 that can be aligned transversely to the direction of travel D, as shown in FIG. 5. In the schematic cross-sections of the variable wing profile 2 in the middle and at the bottom, the suction sides (−) in both halves of the orbit U can be aligned with the inner and outer sides of the orbit U respectively. At the adjustment positions C1, the variable, three-part wing profile 21 is designed as a symmetrical wing profile that is aligned mirror-symmetrically to the profile chord p and to a tangent to the orbit U with the radius r1. For example, the rotor blade 1 is constructed from three rigid extruded hollow profiles 141, which have a front wing segment 211 with a wing leading edge n, a central wing segment 212 in the area of the maximum profile thickness q for holding the stators 161, and a rear wing segment 213 with a trailing edge e. The central wing segment 212 is designed as a longitudinal member of the rotor blade 1 and forms the housing 14 and the abutment 140 for the adjusting device 15 formed by (preferably radial) stepper motors 164. Joint gaps 210 between the wing segments 211-213 enable the laminar flow around the variable wing profile 2 in every operating position. The adjusting device 15 here causes the profile chord p, which is aligned tangentially to the orbit U at the adjustment positions C1, to assume a positive angle of attack α of up to three degrees relative to a tangent to the orbit U in the windward and leeward halves of the orbit U.

FIG. 12 shows a rotor blade 1 with a three-part wing profile 21 and with an adjusting device 15, which is formed by two linear motors 165 integrated into the central wing segment 212 of the rotor blade 1. A lever arm 215 of the front and rear wing segments 211, 213 is connected in an articulated manner in each case with the radius r2 to the hinges 214 with the axes of rotation z of the central wing segment 212 and is connected to the rotors 160 of the linear motors 165. By means of a control unit not shown in detail, the suction side (−) of the variable wing profile 2, as shown in FIG. 5, changes orientation twice from the inside to the outside of the orbit U at the adjustment positions C1 of a diameter of the orbit U that can be freely set in the full angle. The setting function of the adjusting device 15 formed by the two linear motors 165 is activated by applying an electrical voltage, wherein alternately polarized permanent magnets 163 interact with reversible exciter windings 162 of the stators 161 so that, as shown in FIG. 5, in both halves of the orbit U in the longitudinal portions L2 of the rotor blades 1 of a helicopter 130, the positive angle of attack α of the profile chord p of the rotor blade 1 changes orientation from the inside to the outside of the orbit U 20 times within one second by means of the oscillating linear movement of the electric motors 16 arranged in pairs. This applies to a rotor module 10 of the helicopter 130 with a diameter of around ten meters at a rotational speed of 800 km/h. Each rotor 160 has two tongues, each with a plurality of permanent magnets 163 arranged in series and with alternating polarity, which engage in slot-shaped pockets of the stator 161. Due to the air gap a on both sides between the rotors 160 and the stators 161 of the two linear motors 165, a contactless electromagnetic connection can be established between the wing segments 212-213.

Figure 13:
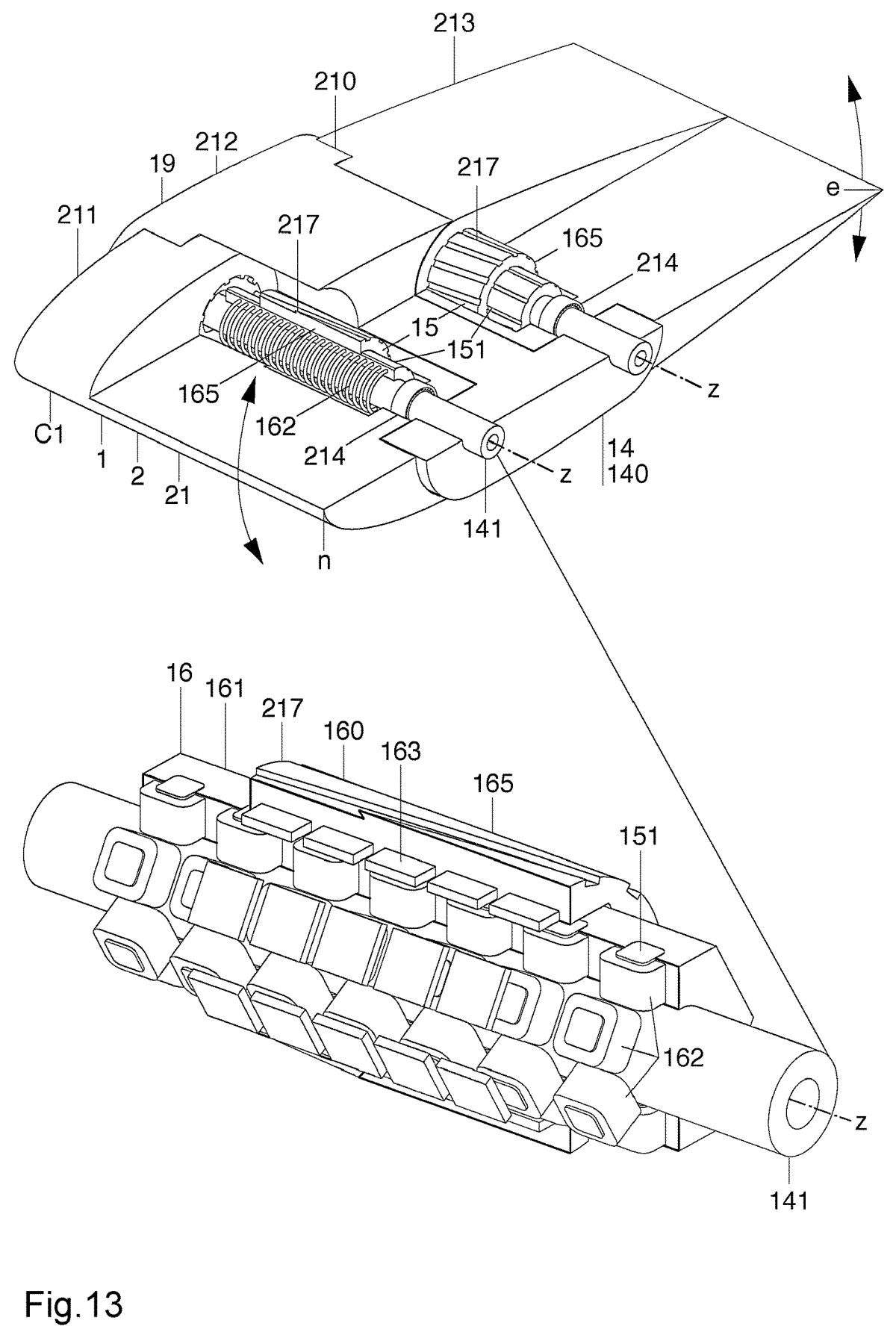

FIG. 13 shows electromagnetic adjusting devices 15 as examples for a longitudinal portion L1-Ln of the rotor blade 1, at the top in an adjustment position C1 with the variable symmetrical wing profile 2. The hinges 214 are each arranged concentrically and coaxially to the axes of rotation z for the front blade segment 211 and the rear blade segment 213, and serve as cable channels for supplying power to the two adjusting devices 15, each formed by a slider 217. In the simple embodiment shown at the top, an iron sleeve or a radial laminated core of the hinge 214 forms the stator 161 with an exciter winding 162 for the adjusting device 15 formed by a slider 217. By reversing the polarity of the exciter winding 162 on the iron sleeve, as shown above, or on radial laminations of the hinge 214, as shown on the linear motor 165 below, the slider 217 performs an oscillating movement with a frequency of 20-30 Hz on a hollow hinge pin, wherein threaded projections of the front and rear blade segments 211, 213 and threaded receptacles of the slider 217 moved by the linear motor 165 engage with each other and cause a rotational movement in opposite directions of rotation at the front and rear blade segments 211, 213. Air bearings between the threads of the hinges 214 and between the rotor 160 and the stator 161 keep the frictional forces low and are supplied with compressed air through the hollow profile 141 of the hinges 214. In the exemplary embodiment shown above, the electromagnetically induced field is aligned parallel to the axes of rotation z, whereas in the linear motor 165 shown below, a plurality of exciter windings 162 of the stator 161 are each aligned radially to the axes of rotation z of the blade segments 211, 213, and the rotor 160, which is arranged concentrically and coaxially to the hinges 214, has a plurality of corresponding permanent magnets 163. The linear motor 165 allows an exact positioning of the slider 217, which is designed as a rotor 160 of the linear motor 165, so that the positive angle of attack α for the blade segments 211, 213 can be set and varied very precisely. The adjusting device 15 with the adjusting and holding function is designed to absorb considerable aerodynamically induced suction forces and centrifugal forces, wherein the front and rear wing segments 211, 213 can be individually adjusted and locked in each longitudinal portion L1-Ln of the rotor blade 1.

FIG. 14 above shows a rotor blade 1 in which the adjusting device 15 has an electric motor 16 whose axis of rotation z' is aligned parallel to the chord p of the variable symmetrical wing profile 2 at the adjustment positions C1 and in which the holding element 151 of the adjusting device 15 has a cylinder lock 152. The variable asymmetrical wing profile 2 with swapped suction sides (–) is shown in the center and at bottom. The front wing segment 211 and the rear wing segment 213 are each joined in an articulated manner to an axis of rotation z of the central wing segment 212 and are adjusted by a bevel gear driven by the electric motor 16 in such a manner that the front and rear wing segments 211, 213 rotate in or out at the adjustment positions C1 in mutually opposite directions towards the inside or outside of the orbit U, the direction of rotation of the electric motor 16 changing twice at the adjustment positions C1 in one revolution of the rotor blade 1. The perspective exploded view shows the adjusting device 15 for an area within a longitudinal portion of the rotor blade 1 with wing segments 211-213, which can be manufactured as hollow profiles 141, for example as extruded aluminum profiles with screw channels (not designated) for connecting the individual parts of the rotor blade 1. The step-locking gear mechanism with cylinder locks 152 shown here does not require any additional energy input to maintain the variable asymmetrical wing profile 2 with exchanged suction sides (–) in the two halves of the orbit U, so that only comparatively low adjustment forces need to be applied by the electric motor 16, since the variable wing profile 2 is in a flag position at the adjustment positions C1, as shown in FIG. 5 and FIG. 7-9.

FIG. 15 shows a rotor blade 1, in which the adjusting device 15 has an electric motor 16 and the retaining element 151 has a worm gear, in the perspective exploded view of a portion of the rotor blade 1 at the adjustment positions C1 of the orbit U, as shown in FIG. 7-9. The design of rotor blade 1 corresponds substantially to the exemplary embodiment described in detail in FIG. 14. In contrast to FIG. 14, the step-locking gear mechanism here has an electric motor 16 whose axis of rotation z' is aligned parallel to the axes of rotation z of the front and rear wing segments 211, 213 and whose locking device is formed by a worm gear not described in more detail, which transmits the adjusting force at the adjustment positions C1 to the front and rear wing segments 211, 213 by means of bevel gears, wherein the central wing segment 212 forms an abutment 140 for the worm gear of the electric motor 16 and changes the direction of rotation of the electric motor 16 twice in one revolution of the rotor blade 1.

FIG. 16 shows a schematic sectional view of a storm surge barrier, such as the one erected on the Oosterschelde. The transverse structure consists of pillars and bridge elements as well as an A-shaped foundation body, which rises in the manner of a ramp on the Oosterschelde side and has a step on the North Sea side. At low tide, the water of the Oosterschelde flows at high speed through a narrow passage between the A-shaped foundation and an upper longitudinal beam of the barrier. Between the pillars of the barrier there extend drum-shaped rotor modules 10 with a diameter of around 10 m and a length of around 30 m, which are braced at intervals of 4 m by disk-shaped cross-beams. A total of six rotor blades 1 with a three-part wing profile 21 connect the disk-shaped cross-beams to one another, forming a rotor drum that is resistant to bending, shear and torsion, the shaft of which is anchored to a watertight bearing of the barrier structure and connected to a motor generator inside the pillars. At the diameter with the adjustment positions C1, the suction side of a rotor blade 1 changes twice in one revolution from the inside to the outside of the orbit U. The rotor blades have a chord length of 2 m and a profile thickness of 0.4 m.

FIG. 17 shows a wind turbine 11 with a vertical axis of rotation y and a spoke wheel 17 on the base side, which wheel carries five rotor modules 10 stacked one over the other, each having eight rotor blades 1. The rotor blades 1 are subdivided into longitudinal portions L1-Ln and have a three-part asymmetrical wing profile 21, which corresponds to the exemplary embodiment shown in FIG. 10-11. As shown in FIG. 7, the suction side (–) of the wing profile 2 changes from the outside to the inside of the orbit and vice versa at the adjustment positions C1 of a diameter C1 that can be aligned to the wind direction within a radius of 360°. The eight rotor blades 1 are spaced at a radius r1 from the vertical axis of rotation y and are each connected at their upper and lower ends to a circumferentially braced ring support 122. With the exception of the joint gaps 210 according to FIG. 11, photovoltaic cells (not designated) preferably cover the surfaces of the three-part wing profiles 21 of the rotor blades 1 and are oriented towards the sun alternately on the inside and on the outside of the orbit U as the rotor modules 10 rotate. The base-side ring support 122 has sixteen compression rods which connect the rotor formed by the five stacked rotor modules 10 to the lower pivot bearing T' of a hub 170, while sixteen pairs of V-shaped tension spokes are braced to the upper pivot bearing T of the hub 170 in such a manner that a vertical lever arm is formed between the upper pivot bearing T and the lower pivot bearing T' in order to transfer the tilting moment of the rotor via the hub 170 into a base, formed as a cantilever, of the wind turbine 11. At 14,000 square meters, the incident flow area of wind turbine 11 corresponds to the rotor diameter of a conventional seven-MW wind turbine with a horizontal axis of rotation, so that up to a wind speed of twelve m/s the wind turbine 11 shown here can also generate a peak output of seven MW, while at wind speeds of more than twelve m/s, when the speed of a conventional wind turbine already has to be throttled back, it can achieve two to three times the output. The wind turbine 11, which as a gyroscope is self-stabilizing, requires only half the construction weight compared to a conventional wind turbine with a horizontal axis of rotation due to its thoroughly lightweight construction with predominantly axially stressed supporting elements.

FIG. 18 shows a wind turbine 11 in which ten rotor blades 1 with an asymmetrical wing profile 2 are supported by a horizontally arranged spoked wheel 17 which forms a rotor module 10. The rotor blades 1 are connected to an outer ring support 122, which is connected to a hub 170 by means of a plurality of radial spokes. The spoked wheel 17 has a diameter of three hundred meters, wherein the rotor blades 1 are divided by the ring support 122 into two halves, each fifty meters long, and a rigid connection formed by a cable tensioning 142 is formed between the ring support 122 and the longitudinal beam of the three-part wing profile 21. The hub 170 of the spoked wheel 17, which is arranged coaxially and concentrically to the vertical axis of rotation y, is rotatably mounted by means of an upper pivot bearing T and a lower pivot bearing T' on a central support structure, which preferably accommodates at least one motor generator in the region of the hub 170. By means of the frame tower, which extends towards the foundation, the wind turbine 11 can be anchored in a foundation both offshore (off the coast) and onshore (on the mainland). With an incident flow area of 30,000 square meters, the wind power installation is designed for a peak output of thirty megawatts.

FIG. 19 shows a floating wind turbine 11 whose rotor module 10 corresponds to the exemplary embodiment shown in FIG. 18. Here as well, the hub 170 of the spoked wheel 17 is rotatably mounted via an upper swivel joint T and a lower swivel joint T' on a central support structure, which accommodates an engine house for a plurality of motor generators in the area of the hub 170 and has a floating body 120 and a buoy 171 with a ballast body at its lower end. The supporting structure can also be referred to as the load-bearing structure. Anchor cables, which are connected to anchors 121 on the seabed, are positioned approximately at the waterline of the floating wind turbine 11. The mass inertia caused by gyroscopic moments acts to stabilize the vertical axis of rotation y of the floating wind turbine 11. In a flowing body of water or in a tidal current, a water turbine with an analogous design can rotate below the waterline about the same axis of rotation y in the opposite direction, so that the ballasted buoy carries a floating wind turbine 11 and a water turbine (not shown).

FIG. 20 shows a wind or water turbine 11, 12 with rotor blades 1 arranged radially to the axis of rotation y in a plane of rotation R, which is designed for a flow F, F' that regularly changes direction diametrally. The six rotor blades are connected to a motor generator arranged coaxially and concentrically to the axis of rotation y and maintain their direction of rotation when the direction of the flow F, F' changes. This is the case, for example, in a wave power plant with a housing 14, in which the shaft displaces a volume of air from the housing 14 so that an onshore air flow is used to drive a wind turbine. Here, the wind turbine 11 is driven by an offshore air flow generated by the returning shaft while maintaining the direction of rotation by changing the suction side (−) of the six radial rotor blades 1 to the side facing away from the flow by means of the adjusting device 15. A flow F, F' that periodically changes direction is also generated by tidal currents, so that a water turbine 12 in principle has the same structure as the air turbine. It is advantageous for both the wind turbine and the water turbine 11, 12 that in a neutral transitional position when the direction of the flow F, F' changes, the chord p of the variable wing profile is arranged parallel to the plane of rotation R and, by means of the adjusting device 15, the chord p has a positive angle of attack α of up to four degrees relative to the temporarily present symmetrical wing profile 2, so that a maximum tangential drive force in the plane of rotation R can be derived from the lift force resulting from the flow velocity and the rotational velocity. The cutaway perspective in the center shows the transitional position of the rotor blades 1 of the rotor module 10, in which the variable asymmetrical wing profile 2 temporarily has a symmetrical wing profile 2.

FIG. 21 shows a wind turbine 11 with a rotor module 10, which has a cable-tensioned spoked wheel 17 with a plurality of radial support and tensioning cables, which are tensioned with an outer ring support 122 arranged in the plane of rotation R' and with a hub 170. In the plane of rotation R' of the spoked wheel 17, ten rotor blades 1 are arranged radially to the axis of rotation y and each have a three-part wing profile 21, the central wing segment 212 of which is clamped to two rotor heads of the ring support 122 that are diametrally oppositely situated in the plane of rotation R'. The rotor module 10 is held by a fork that is connected in an articulated manner to the upper end of a mast in an azimuth bearing (pivot bearing). The ten radial rotor blades 1 rotate in the vertical plane of rotation R' of the spoked wheel 17 on an annular orbit U which is defined by an inner radius r1 and an outer radius r2 about the center of rotation y, and together with the spoked wheel 17 form a rotor module 10 of extremely lightweight construction. The ring support 122, the suspension and tensioning cables, and the rotor blades 1 are preferably at least partially made of carbon fiber composite materials. The total of ten rotor blades 1 are twisted by ten degrees over a length of sixty meters, wherein a stepped arrangement enables the formation of a plurality of longitudinal portions L1-Ln that are straight in themselves, so that the rotor blade 1 can be adjusted as shown in FIG. 22 in such a manner that a positive angle of attack α of five degrees is formed in the operating position, wherein the symmetrical wing profile 2 has a positive angle of attack α of one degree and a negative angle of attack α' of three degrees is required for the stall position, so that the adjustment range of the three-part wing profile 21 is seven degrees in total. The electromechanical adjusting device 15 integrated into the housing 14 formed by the central blade segment 212 corresponds to the example shown in FIG. 14 or FIG. 15. The wind turbine 11 shown in FIG. 21 can be operated at wind speeds of more than 12 m/s without restrictions. If, for example, a positive angle of attack α of the asymmetrical wing profile 2 of the rotor blades 1 alternates regularly with a negative angle of attack α', the speed of the windmill can be regulated continuously by means of the adjusting device 15, wherein the suction side (−) of the rotor blade 1 oriented opposite the wind direction generates thrust which can be offset against the thrust acting in the wind direction, so that the load on the supporting structure is relieved. In addition, the stall position allows the wind turbine 11 to be shut down for maintenance and cleaning work.

FIG. 22 shows an electromechanical adjusting device 15 which corresponds to the exemplary embodiment described in FIG. 14, in three cross-sections of the asymmetrical wing profile 2 of a rotor blade 1 of the wind turbine 11 according to FIG. 21 in the area of the longitudinal portions L1-Ln of the rotor blade 1 adjacent to the ring support 122. The rotor blades 1 are twisted and are inclined at their end facing the axis of rotation y to a maximum relative to the plane of rotation R' of the spoke wheel 17, while the angle of inclination decreases continuously toward the outer end of the rotor blade 1. The central wing segment 212 forms a housing 14 and an abutment 140 for the adjusting device 15 described in FIG. 14, which is integrated into the hollow profile 141 of the longitudinal member. The adjustment range between a positive and a negative angle of attack α,α', which can be realized in all longitudinal portions L1-Ln of the rotor blade 1 by means of the adjusting device 15, enables stepless adaptation to the wind speed with a stall pitch regulation up to standstill of the rotor module 10, wherein the profile chord p of the three-part wing profiles 21 has a negative angle of attack α', as shown on the lower profile cross-section. The asymmetrical wing profile 2 at the top shows a positive angle of attack α of 4 degrees, which is designed such that the rotor blade 1 produces a maximum tangential lift force effective in the direction of rotation. For wind speeds above 12 m/s, a symmetrical wing profile of the three-part wing profile 21 can be used temporarily, wherein the lift force and also the tangential drive force are reduced by around a third compared to the asymmetrical wing profile 2 shown above. By further simultaneous rotation of the front wing segment 211 and the rear wing segment 213 in the windward direction, the angle of attack α' becomes negative and causes the suction side (–) of the asymmetrical wing profile 2 shown at bottom to change from the leeward side to the windward side, reaching a stall position in which the tangential drive force acts against the direction of rotation.

FIG. 23 shows a rotary-wing vehicle 13 designed as a helicopter 130 with a rotor module 10 formed by four bow-shaped rotor blades 1, in each of which two pairs of oppositely situated rotor blades 1 rotate in opposite directions about the axis of rotation y. The fuselage of the helicopter 130 is designed as a cabin for preferably nine passengers and a pilot, and preferably has a streamlined teardrop shape, at the rear end of which a propeller arrangement 131 is arranged. The four bow-shaped rotor blades are each connected to the fuselage at their upper and lower ends via pivot bearings T, T'. In each case, a rotor blade 1 is subdivided into three longitudinal portions L1-L3, with the outermost longitudinal portion L2 encircling the fuselage, including the propeller arrangement 180, at the rear, and being designed, as shown in FIG. 5, to direct the thrust in any direction in a 360° radius during hovering flight, while the rotor module 10 of the helicopter 130 is designed in the longitudinal portions L1, L3 to generate lift which can be controlled by means of the adjustable asymmetrical wing profile 2. The propeller arrangement 131 at the rear, formed by two counter-rotating propellers, is used exclusively to generate thrust in the direction of flight, so that flight speeds of up to five hundred km/h are enabled with a hybrid propulsion design. A drive power of six hundred to eight hundred KW is sufficient to enable this flight performance.

FIG. 24 shows an aircraft 18 in which the variable asymmetrical wing profile 2 is used to form the wings 180. The central wing segment 212 of the asymmetrical wing profile 2 is rigidly connected to the fuselage of the aircraft 18 and serves as a longitudinal member for the wing 180. The electrically powered aircraft 18 is designed for an operating speed of 500 km/h, for example. The electromechanical adjusting device 15 corresponds to the exemplary embodiment explained in FIG. 15. The first profile cross section, viewed from top to bottom, shows an asymmetrical wing profile 2 whose chord p has a positive angle of attack α of 1.5 to 2 degrees with respect to a relative incident flow δ and with respect to the longitudinal center axis x of the aircraft, while the second cross section shows a wing position with a larger angle of attack α of about three to four degrees, which increases the lift generated by the wing 180.

The lower cross-section shows a wing position for takeoff and landing, in which the front wing segment 211 and the rear wing segment 213 are turned in relative to the central wing segment 212 formed by the longitudinal member to such an extent that the wing profile p has a positive angle of attack α of 6 degrees relative to the longitudinal central axis x of the aircraft 18. Joint gaps 210 between the three wing segments 211-213 allow a laminar flow around the wing profile 2 of the wing 180. The complete integration of the adjusting device 15 into the housing 14 formed by the central wing segment 212 eliminates the need for conventional slats and flaps, including the flap carrier fairings, the so-called canopies on the underside of the wing.

Naturally, many variations and modifications are possible within the scope of the present invention.

| List of reference signs | | | |
|---|---|---|---|
| Rotor blade | 1 | Asymmetrical wing profile | 2 |
| Rotor module | 10 | Suction side | (—) |
| Wind turbine | 11 | Angle of attack, positive, negative | α, α' |
| Water turbine | 12 | Offset angle | β |
| Floating body | 120 | Incident flow | δ |
| Anchor | 121 | Air gap | a |
| Ring support | 122 | Adjustment positions | C1, C2 |
| Rotary wing vehicle | 13 | Wing trailing edge | e |
| Helicopter | 130 | Flow | F, F' |
| Propeller arrangement | 131 | Flight direction | D |
| Housing | 14 | Longitudinal portion | L1-Ln |
| Abutment | 140 | Wing leading edge | n |
| Hollow profile | 141 | Profile chord | p |
| Cable tensioning | 142 | Profile thickness | q |
| Adjusting device | 15 | Radius | r1, r2 |
| Retaining element | 151 | Plane of rotation | R, R' |
| Cylinder lock | 152 | Pivot bearing | T, T' |
| Electric motor | 16 | Orbit | U |
| Rotor | 160 | Longitudinal axis | x |
| Stator | 161 | Axis of rotation | y |
| Exciter winding | 162 | Axis of rotation | z, z' |
| Permanent magnet | 163 | Three-part wing profile | 21 |
| Stepper motor | 164 | Joint space | 210 |
| Linear motor | 165 | Front wing segment | 211 |
| Spoked wheel | 17 | Central wing segment | 212 |
| Hub | 170 | Rear wing segment | 213 |
| Ballasted buoy | 171 | Hinge | 214 |
| Airplane | 18 | Lever arm | 215 |
| Wing | 180 | Counterweight | 216 |
| Circulation positions | I-XII | Slider | 217 |

The invention claimed is:

1. A device comprising:

an asymmetrical wing profile and an adjusting device, which asymmetrical wing profile has a profile thickness and a profile chord extending between a wing leading edge and a wing trailing edge, which asymmetrical wing profile has, in at least one longitudinal portion, a three-part variable wing profile in which a front and a rear wing segments are joined to a central wing segment in an articulated manner by means of two hinges having axes of rotation and are designed to permit a rotational movement about an associated axis of rotation with respect to the central wing segment, which central wing segment forms an inherently rigid housing for receiving the adjusting device and has, as a longitudinal member of the asymmetrical wing profile, a hollow profile which forms an abutment for the adjusting device in at least one longitudinal portion, the adjusting device having at least one electric motor provided in the central wing segment and being designed to, with the aid of the at least one electric motor, enable a simultaneous rotating in or out of the front and rear wing segments with opposite directions of rotation to one another and thus a variable suction side of the asymmetrical wing profile, the angle of attack of the profile chord changing when the front and rear wing segments are rotated in or out;

a plurality of the asymmetrical wing profiles and a motor generator, which wing profiles are designed as rotor blades, which rotor blades form a rotor module, which rotor module is designed to rotate on an orbit with radii about an axis of rotation, which rotor blades are connected to the motor generator.

2. The device according to claim 1, wherein the rotor blades are connected at at least one end to the motor generator, and in which the rotor module has a diameter with adjustment positions that divides the orbit into two halves, wherein the suction side of the variable wing profile is adjusted by means of the adjusting device in a first half of the orbit on the outside and in a second half on the inside of the orbit, and wherein the variable wing profile temporarily has a symmetrical wing profile at the diameter with the adjusting positions, the profile chord of which is aligned tangentially to the circular orbit of the rotor module at the adjustment positions and the profile chord has a positive angle of attack relative to a tangent on the orbit by turning the front and rear wing segments in and out, in each case in the opposite direction of rotation, in both halves of the orbit, and the longitudinal member of the central wing segment is designed as a box-shaped hollow profile whose flanges opposite one another on the orbit form a part of the surface of the asymmetrical wing profile and a plurality of hollow profiles are connected at nodal points to transversely stiffening ring supports and form a self-supporting rotor module which is inherently rigid against bending, shear, and torsion.

3. The device according to claim 1, wherein the rotor blades are aligned parallel to the axis of rotation in the at least one longitudinal portion, wherein the adjusting device is actuated, at a diameter of the orbit with the radius at oppositely situated adjusting positions which are freely adjustable in the full angle, in such a manner that the suction side of the variable wing profile changes in one revolution of the rotor blade from the outside to the inside of the orbit and vice versa, wherein the front and rear wing segments are each adjustable at the adjustment positions in the axes of rotation of the hinges in opposite directions of rotation by a maximum of 9 degrees.

4. The device according to claim 1, wherein the at least one electric motor comprises at least two electric motors which are designed as sectionally active stepper motors which are integrated into the central wing segment in such a manner that the longitudinal member forms an abutment for a stator of the sectionally active stepper motor in each longitudinal portion, which stator has two laminations with exciter windings opposite one another on the orbit and, together with alternately poled permanent magnets of the rotors of the front and rear wing segment, forms the sectionally effective stepper motor, wherein the permanent magnets are connected to a lever arm rotatable about the axes of rotation and form counterweights for the front and rear wing segments of the rotor blade, so that with an air gap at both sides between the stator and the permanent magnet of the rotor a direct, contactless connection is established between the central wing segment and the front and rear wing segments in order to effect the electrical rotating in and out of the front and rear wing segment simultaneously, with opposite directions of rotation, by reversing the polarity of the exciter windings of the stator.

5. The device according to claim 1, wherein the adjusting device is designed as an electromechanical adjusting device with retaining elements, wherein the at least one electric motor is provided with a step detent gear mechanism in each longitudinal portion of the rotor blade, and which retaining elements are formed either by a cylinder lock connected to the shaft of the electric motor or by a worm gear connected to the shaft of the electric motor, wherein the direction of rotation of the electric motor changes at each of the adjustment positions of the orbit with the step detent gear mechanism in one revolution of the rotor blade.

6. The device according to claim 1, wherein the device is designed as a rotary wing vehicle, as a wind turbine, or as a water turbine, wherein in the case of the rotary-wing vehicle, at adjustment positions of the orbit, the suction side of the variable wing profile of the rotor blades can be aligned with a particular flight direction by means of the adjusting device in both halves of the orbit of the rotor module, and the motor generator is operated as a motor in order to generate thrust, and in the case of the wind or water turbine, the suction side of the variable wing profile of the rotor blades can be aligned with a leeward side of the flow by means of the adjusting device, independently of a horizontally or vertically aligned axis of rotation at the adjustment positions of the orbit, and the motor generator can be operated at least temporarily as a generator and can be operated at least temporarily as a motor in order to accelerate the wind or water turbine to a speed required for self-running when the flow is weak.

7. The device according to claim 1, wherein the device is designed as a rotary-wing vehicle, and is designed either with a rotor module or with a front-side and a rear-side rotor module rotating in opposite directions of rotation, wherein the rotor blade is formed in the shape of a bow and has a lower longitudinal portion running ahead in the direction of rotation of the rotor module, a central longitudinal portion, and an upper longitudinal portion running behind in the direction of rotation of the rotor module, wherein the lower longitudinal portion has an offset angle in the circumferential direction relative to the upper longitudinal portion and the central longitudinal portion connects the lower longitudinal portion to the upper longitudinal portion and is formed with an incline in the direction of rotation, in which rotor module the diameter in the lower and upper longitudinal portions can be aligned with the adjustment positions in each case in the direction of flight and in the central longitudinal portion in each case transversely to the direction of flight.

8. The device according to claim 1, wherein the device is designed as a helicopter, in which the rotor module formed by four bow-shaped rotor blades together with a tail-side propeller arrangement connected to a fuselage of the helicopter forms a hybrid drive system, in which the four bow-shaped rotor blades each rotate in pairs and in opposite directions about the axis of rotation and about a streamlined fuselage including the tail-side propeller arrangement, wherein a bow-shaped rotor blade has a longitudinal portion arranged above and below the fuselage parallel to the longitudinal axis and the longitudinal portion is connected at its outer ends by a longitudinal portion arranged parallel to the axis of rotation, which portion is designed to align the diameter with adjustment positions in a radius of 360 degrees, in each case perpendicular to a selectable flight direction in order to generate thrust in the selectable flight direction from a stationary position.

9. The device according to claim 1, wherein the device is designed as a water turbine which has a horizontally or vertically aligned axis of rotation, which is anchored floating in a body of water with a flow either in a transverse structure of the flowing water or in the flowing water, and which has a floating body on the water surface, which is anchored to the bottom of the body of water by means of at least one anchor and anchor cables and accommodates an annular, gearless motor generator with a shaft which has a radial distance with a radius from at least one upper and one lower ring support of the rotor module below the floating body, and which upper and lower ring supports are connected together with the shaft and with the longitudinal members of the three-part wing profiles to form a bending-, shear- and torsionally rigid rotor module.

10. The device according to claim 1, wherein the rotor blades are straight and rotate on an orbit with an inner and an outer radius in a plane of rotation about the axis of rotation, wherein the longitudinal member of the rotor blade formed by the central wing segment is connected to the motor generator either at its outer or at its inner end, and the adjusting device in the case of a wind turbine or a water turbine are designed to align the suction sides of the variable wing profiles in a flow which periodically changes direction diametrally to a leeward side, and in the case of a rotary wing vehicle, is designed to generate a thrust in the direction of flight or a reverse thrust against the direction of flight, or in the case of a rotary wing vehicle with a transverse thruster, is designed as a transverse thruster to generate thrust in one of two possible directions.

11. The device according to claim 1, wherein the device is designed as a wind turbine or as a water turbine, and which is set up to change the suction side of a plurality of rotor blades arranged perpendicularly and radially to an axis of rotation in a flow which regularly changes direction, by means of the adjusting device, synchronously with the change of the flow direction in each case towards the side facing away from the flow, wherein the variable wing profile of the rotor blade in a transitional position temporarily has a symmetrical wing profile with an angle of attack of the profile chord of zero degrees, and due to the actuation of the adjusting device the working position in each case of the asymmetrical wing profile has a positive angle of attack.

12. The device according to claim 1, wherein the device is designed as a wind turbine, in which the rotor module is designed as a gyroscope for using the mass inertia caused by gyroscopic moments and gyroscopic forces for stabilizing a vertical axis of rotation of the rotor module designed as a spoked wheel with a horizontal plane of rotation, in which rotor module supporting and tensioning cables connect an outer ring support, which is spaced apart from the axis of rotation by a radius, to a hub, wherein the ring support, which is designed as a thrust ring, carries a plurality of straight rotor blades arranged parallel to the axis of rotation, which are connected to the hub by means of a cable tensioning of the longitudinal members with the ring support and with the spokes of the spoked wheel formed by supporting and tensioning cables, and via an upper and a lower pivot bearing to a supporting structure of the wind turbine, in such a manner that an air gap is formed between at least one stator on the supporting structure side arranged coaxially and concentrically to the axis of rotation and at least one rotor on the rotor side of the motor generator of the wind turbine, wherein the supporting structure can be anchored onshore or offshore in a building ground.

13. The device according to claim 1, wherein the device is designed as a wind turbine in which a plurality of rotor modules is stacked vertically on top of one another and is supported by a ring support on the base side, which forms a thrust ring of a spoke wheel which is resistant to bending, shearing and torsion, whose hub, arranged concentrically and coaxially to the axis of rotation, accommodates the rotor of the motor generator on the inside and is connected by means of an upper pivot bearing and a lower pivot bearing via an air gap to a stator of the motor generator arranged coaxially and concentrically to the axis of rotation, which stator is connected either to a cantilever arm of a foundation of the wind turbine or, in the case of a floating wind turbine, to a ballasted buoy.

14. The device according to claim 1, wherein the device is designed to enable a rotation of the rotor module about a horizontal axis of rotation and a rotation of a cable-tensioned spoke wheel with a hub and with an outer ring support formed as a thrust ring in a vertical plane of rotation, which rotor module can be aligned to the direction of the flow in each case by means of an azimuth bearing on a mast, and which device is designed to rotate a plurality of rotor blades on an annular orbit with radii about the horizontal axis of rotation and, in the vertical plane of rotation, to connect the central wing segments of the inherently twisted rotor blades to the ring support in a manner rigid against bending by means of rotor heads situated opposite one another in pairs in such a manner that in each longitudinal portion of a twisted rotor blade the chord f the asymmetrical wing profile has a positive angle of attack of up to 7 degrees relative to an incident flow resulting from the wind speed and the rotational speed.

15. The device according to claim 1, wherein the at least one electric motor comprises at least two electric motors with stators and with rotors, in which the stators are connected to the central wing segment, in which one of the rotors is connected to the front wing segment, and in which one of the rotors is connected to the rear wing segment.

16. The device according to claim 1, wherein the adjusting device comprises an electromechanical connection formed by stepped detent gear mechanisms between the front and rear wing segments and the at least one electric motor integrated in the central wing segment.

17. The device according to claim 1, wherein joint gaps are formed between the central wing segment on the one hand and the front wing segment with the wing leading edge and the rear wing segment with the wing trailing edge on the other hand, in order to enable a laminar flow around the asymmetrical wing profile.

18. The device according to claim 1, wherein the adjusting device is designed as a fully electric adjusting device with two linear motors integrated in the central wing segment, which linear motors are each joined in an articulated manner with a lever arm to the axes of rotation of the front and rear wing segments.

19. The device according to claim 1, wherein the at least one electric motor has at least two electric motors which are designed as linear motors arranged coaxially and concentrically to the axes of rotation of the hinges of the central wing segment, wherein the adjusting device have sliders which are guided linearly on the hinges and engage on their outer sides in threaded portions of the front and rear wing segments, so that the rotating in and out of the front and rear wing segments relative to the longitudinal member, which is inherently rigid, can be effected by a linear translational movement of the slider.

20. A device comprising:

an asymmetrical wing profile and an adjusting device, which asymmetrical wing profile has a profile thickness and a profile chord extending between a wing leading edge and a wing trailing edge, which asymmetrical wing profile has, in at least one longitudinal portion, a three-part variable wing profile in which a front and a rear wing segments are joined to a central wing segment in an articulated manner by means of two hinges having axes of rotation and are designed to permit a rotational movement about an associated axis of rotation with respect to the central wing segment, which central wing segment forms an inherently rigid housing for receiving the adjusting device and has, as a longitudinal member of the asymmetrical wing profile, a hollow profile which forms an abutment for the adjusting device in at least one longitudinal portion, the adjusting device having at least one electric motor provided in the central wing segment and being designed to, with the aid of the at least one electric motor, enable a simultaneous rotating in or out of the front and rear wing segments with opposite directions of rotation to one another and thus a variable suction side of the asymmetrical wing profile, the angle of attack of the profile chord changing when the front and rear wing segments are rotated in or out;

wherein the device is designed as an aircraft with at least one wing, in which the adjusting device has a step detent gear mechanism and a retaining element, wherein in at least one longitudinal portion of the asymmetrical wing profile the central wing segment, with at least one electric motor and the front and rear wing segments of the three-part wing profile, are connected to the retaining element of the adjusting device in such a manner that the lift produced by the suction side of the variable wing profile can be adapted to the flight situation of the aircraft by actuating the adjusting device.

21. The device according to claim 20, wherein the at least one electric motor comprises at least two electric motors with stators and with rotors, in which the stators are connected to the central wing segment, in which one of the rotors is connected to the front wing segment, and in which one of the rotors is connected to the rear wing segment.

22. The device according to claim 20, wherein the adjusting device comprises an electromechanical connection formed by stepped detent gear mechanisms between the front and rear wing segments and the at least one electric motor integrated in the central wing segment.

23. The device according to claim 20, wherein joint gaps are formed between the central wing segment on the one hand and the front wing segment with the wing leading edge and the rear wing segment with the wing trailing edge on the other hand, in order to enable a laminar flow around the asymmetrical wing profile.

24. The device according to claim 20, wherein the adjusting device is designed as a fully electric adjusting device with two linear motors integrated in the central wing segment, which linear motors are each joined in an articulated manner with a lever arm to the axes of rotation of the front and rear wing segments.

25. The device according to claim 20, wherein the at least one electric motor has at least two electric motors which are designed as linear motors arranged coaxially and concentrically to the axes of rotation of the hinges of the central wing segment, wherein the adjusting device have sliders which are guided linearly on the hinges and engage on their outer sides in threaded portions of the front and rear wing segments, so that the rotating in and out of the front and rear wing segments relative to the longitudinal member, which is inherently rigid, can be effected by a linear translational movement of the slider.

* * * * *